United States Patent [19]

Itoh et al.

[11] 4,364,348
[45] Dec. 21, 1982

[54] METHOD AND APPARATUS FOR CONTROLLING THE IDLING SPEED OF AN ENGINE

[75] Inventors: Hiroshi Itoh, Nagoya; Nobuyuki Kobayashi, Toyota, both of Japan

[73] Assignee: Toyota Jidosha Kogyo Kabushiki Kaisha, Toyota, Japan

[21] Appl. No.: 279,515

[22] Filed: Jul. 1, 1981

[30] Foreign Application Priority Data

Jan. 23, 1981 [JP] Japan .................................. 56-8147

[51] Int. Cl.$^3$ ............................................. F02N 17/00
[52] U.S. Cl. .................................. 123/339; 123/340; 123/179 G; 123/179 B
[58] Field of Search ............... 123/339, 588, 586, 589, 123/179 L, 179 G, 179 B

[56] References Cited

U.S. PATENT DOCUMENTS

| | | | |
|---|---|---|---|
| 3,960,130 | 6/1976 | Peterson | 123/588 |
| 4,106,451 | 8/1978 | Hattori | 123/588 |
| 4,106,451 | 8/1978 | Hattori | 123/589 |
| 4,173,957 | 11/1979 | Hattori | 123/589 |
| 4,175,521 | 11/1979 | Hattori | 123/589 |
| 4,237,833 | 12/1980 | Des Lauriers | 123/339 |
| 4,294,217 | 10/1981 | Glockler | 123/588 |

FOREIGN PATENT DOCUMENTS

| | | | |
|---|---|---|---|
| 2628091 | 1/1977 | Fed. Rep. of Germany ... | 123/198 F |
| 2655461 | 6/1977 | Fed. Rep. of Germany ... | 123/198 F |
| 2752877 | 6/1978 | Fed. Rep. of Germany ... | 123/198 F |

*Primary Examiner*—Ronald B. Cox
*Attorney, Agent, or Firm*—Cushman, Darby & Cushman

[57] ABSTRACT

An engine has a main intake passage having a throttle valve therein. A bypass passage is branched off from the main intake passage located upstream of the throttle valve and is connected to the main intake passage located downstream of the throttle valve. A flow control valve, actuated by a stepper motor, is arranged in the bypass passage. When the engine is started, the control valve is moved from the fully opened position to a predetermined position for reducing the flow area of the bypass passage. Then, the control valve is gradually closed as the temperature of the cooling water of the engine is increased.

21 Claims, 24 Drawing Figures

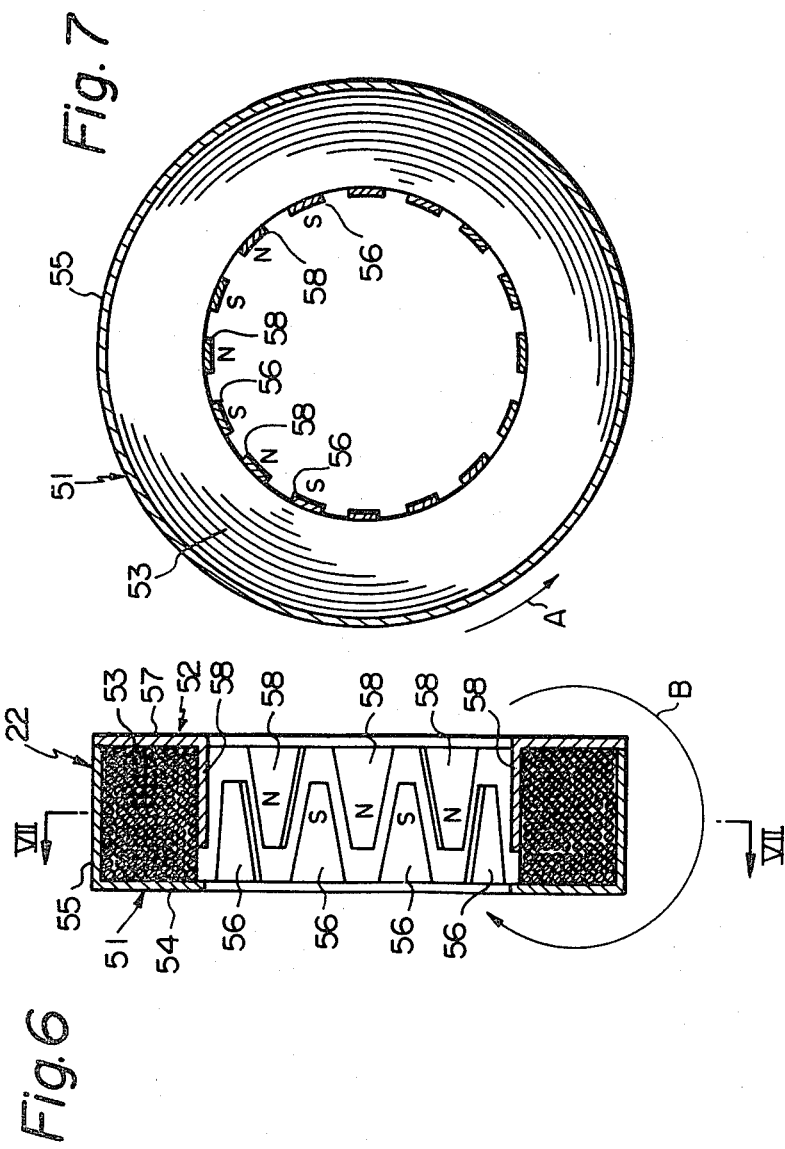

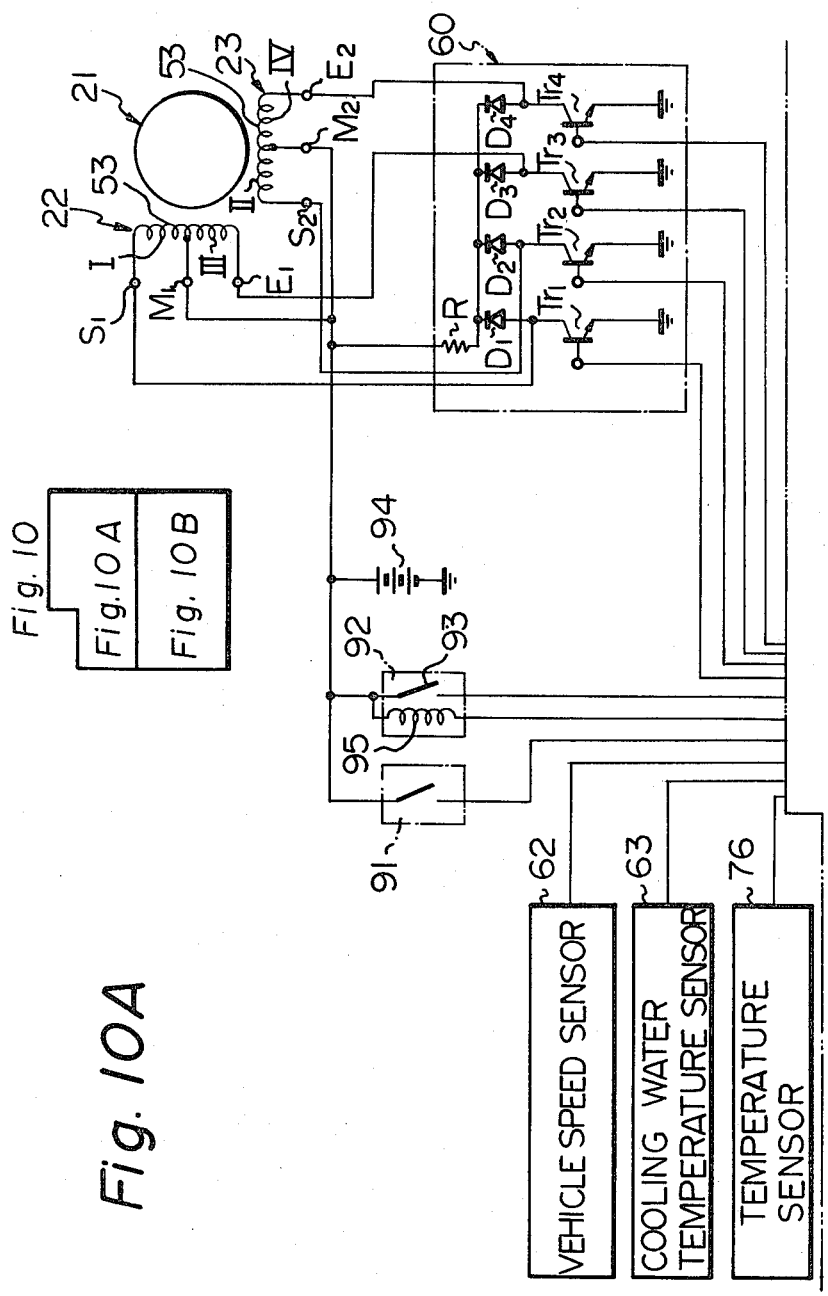

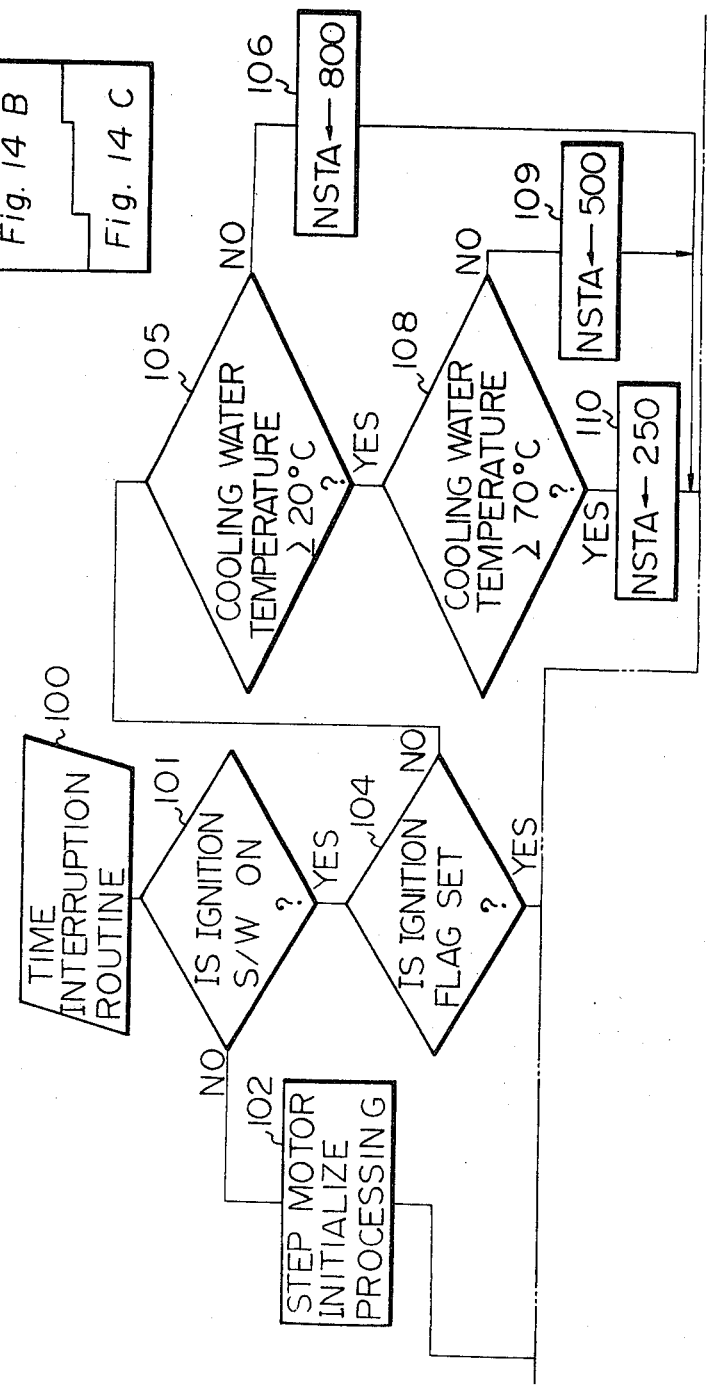

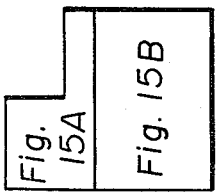
Fig. 15A
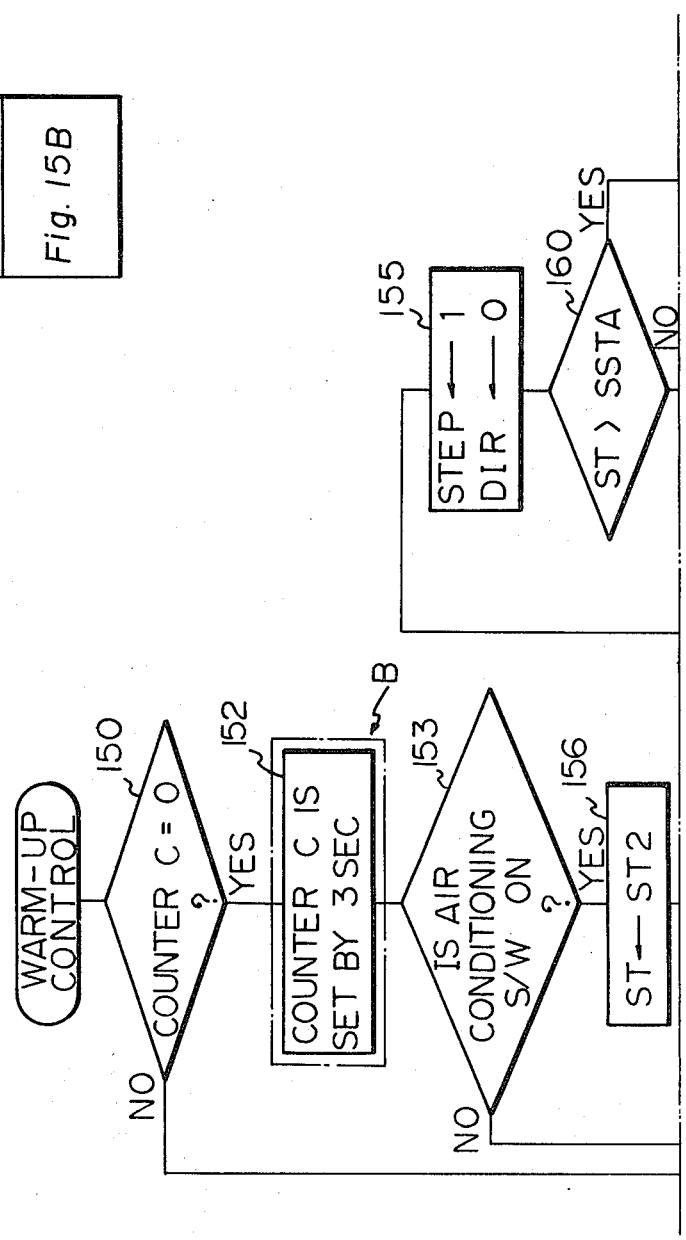

METHOD AND APPARATUS FOR CONTROLLING THE IDLING SPEED OF AN ENGINE

DESCRIPTION OF THE INVENTION

The present invention relates to a method and apparatus for controlling the idling speed of an internal combustion engine.

An idling speed control device has been known in which a bypass passage is branched off from the intake passage of an engine, which is located upstream of a throttle valve, and connected again to the intake passage located downstream of the throttle valve, with a diaphragm type vacuum operated control valve device being arranged in the bypass passage. The diaphragm vacuum chamber of the control valve device is connected via a vacuum conduit to the intake passage located downstream of the throttle valve, and an electromagnetic control valve is arranged in the vacuum conduit for controlling the cross-sectional area of the vacuum conduit. In this idling speed control device, at the time of idling, the level of the vacuum produced in the diaphragm vacuum chamber of the control valve device is controlled by controlling the electromagnetic control valve in accordance with the operating condition of the engine and, in addition, the air flow area of the bypass passage is controlled in accordance with a change in the level of the vacuum produced in the diaphragm vacuum chamber. As a result of this, the amount of air feed into the cylinders of the engine from the bypass passage is controlled.

However, in such a conventional idling speed control device, firstly, in the case wherein a vehicle is used in a cold region, the electromagnetic control valve becomes frozen and, thus, it is impossible to control the cross-sectional area of the vacuum conduit. As a result of this, since it is also impossible to control the air flow area of the bypass passage, a problem occurs in that it is impossible to control the amount of air fed into the cylinders from the bypass passage. Secondly, in a conventional idling speed control device, since the diaphragm type vacuum operated control valve device is used, the controllable range of the air flow area of the bypass is very narrow. Therefore, even if the control valve device is fully opened, air, the amount of which is necessary to operate the engine at the time of fast idling, cannot be fed into the cylinders of the engine from the bypass passage. Consequently, in a conventional idling speed control device, an additional bypass passage is provided in addition to the regular bypass passage, and a valve, which is actuated by a bimetallic element, is arranged in the additional bypass passage. When the temperature of the engine is low, the valve, which is actuated by the bimetallic element, opens. As a result of this, since additional air is fed into the cylinders of the engine from the additional bypass passage in addition to the air fed into the cylinders of the engine from the regular bypass passage, the amount of air, which is necessary to operate the engine at the time of fast idling, can be ensured.

As mentioned above, in a conventional idling speed control device, since the additional bypass passage and the valve, actuated by the bimetallic element, are necessary in addition to the regular bypass passage, a problem occurs in that the construction of the idling speed control device will be complicated. In addition, since the amount of air fed into the cylinders of the engine is controlled by only the expanding and shrinking action of the bimetallic element at the time of fast idling, there is a problem in that it is impossible to precisely control the amount of air fed into the cylinders of the engine.

SUMMARY OF THE PRESENT INVENTION

An object of the present invention is to provide a novel of, and apparatus for, controlling the idling speed, which method are capable of precisely controlling the amount of air flowing within the bypass passage at the time of idling and maintaining the idling speed of the engine at an optimum speed.

According to the present invention, there is provided a method and apparatus for controlling an idling speed of an engine comprising a main intake passage, a throttle valve arranged in the main intake passage, a bypass passage branched off from the main intake passage upstream of the throttle valve and connected to the main intake passage downstream of the throttle valve, a control valve arranged in the bypass passage, and a stepper motor actuating the control valve for controlling the amount of air flowing within the bypass passage, wherein said method comprises rotating the stepper motor at a first rotating speed from an initial step position wherein the control valve is fully opened to a first step position determined by the temperature of a coolant of the engine for reducing the flow area of the bypass passage when the engine is started.

The present invention may be more fully understood from the description of the preferred embodiments of the invention set forth below, together with the accompanying drawings.

BRIEF DESCRIPTION OF THE DRAWINGS

In the drawings

FIG. 6 is a cross-sectional side view of a stator;

FIG. 7 is a cross-sectional view taken along the line VII—VII in FIG. 6;

FIGS. 10A and 10B are a circuit of an electronic control unit;

FIGS. 14A–C are a flow chart illustrating the general flow of the operation of an embodiment according to the present invention;

FIGS. 15A and 15B are a flow chart illustrating the warm-up control in FIG. 14;

DESCRIPTION OF PREFERRED EMBODIMENTS

Figure 1:
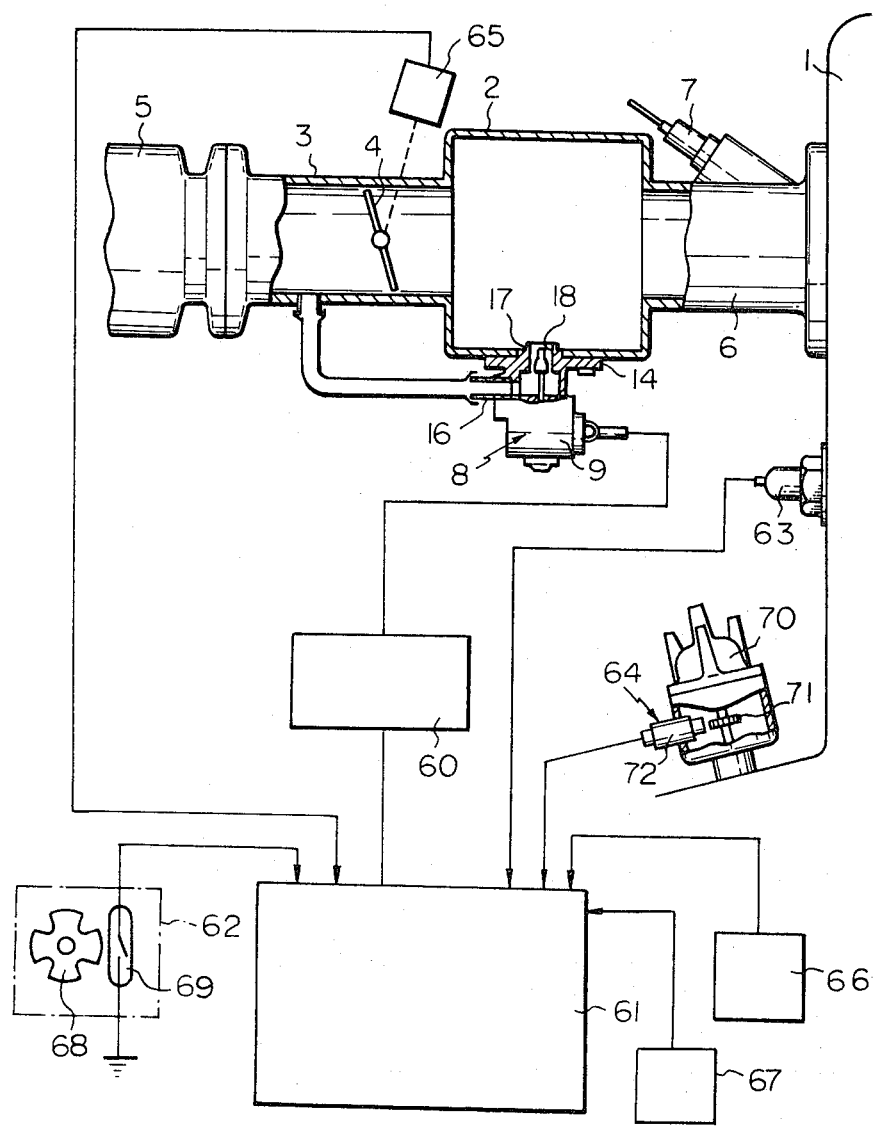
FIG. 1 is a side view, partly in cross-section, of an intake system equipped with an idling speed control device according to the present invention.
Figure 2:
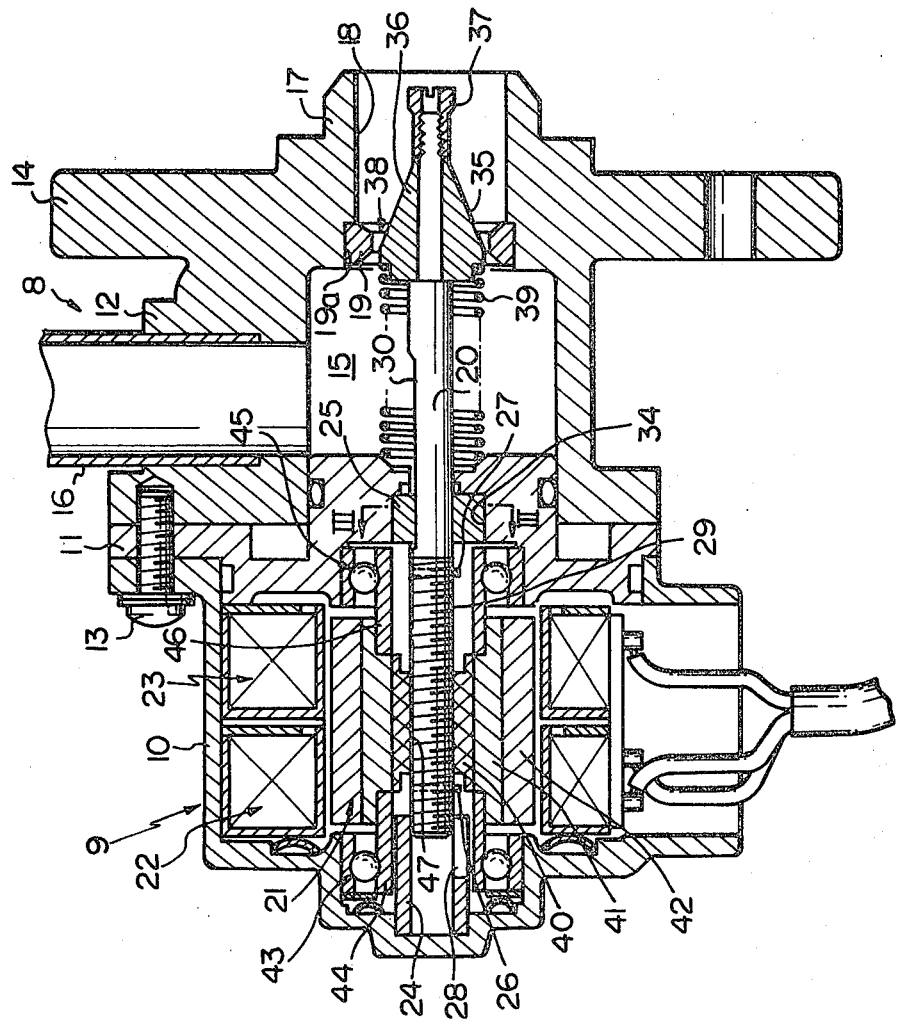
FIG. 2 is a cross-sectional side view of a flow control valve device.

Referring to FIG. 1, 1 designates an engine body, 2 a surge tank, 3 an intake duct, 4 a throttle valve and 5 an air flow meter. The inside of the intake duct 3 is connected to the atmosphere via the air flow meter 5 and an air cleaner (not shown). The surge tank 2, which is common to all the cylinders of the engine, has a plurality of branch pipes 6, each being connected to the corresponding cylinder of the engine. A fuel injector 7 is provided for each cylinder and mounted on the corresponding branch pipe 6. In addition, a flow control valve device 8 is mounted on the surge tank 2. As illustrated in FIG. 2, the flow control valve device 8 comprises a motor housing 10 of a stepper motor 9, a motor housing end plate 11 and a valve housing 12. The motor housing 10, the end plate 11 and the valve housing 12 are interconnected to each other by means of bolts 13. As illustrated in FIGS. 1 and 2, a flange 14 is formed in one piece on the valve housing 12 and fixed onto the outer wall of the surge tank 2. A valve chamber 15 is formed in the valve housing 12 and connected via a bypass pipe 16, fixed onto the valve housing 12, to the inside of the intake duct 3, which is located upstream of the throttle valve 4. In addition, a hollow cylindrical projection 17, projecting into the surge tank 2, is formed in one piece on the side wall of the flange 14, and a cylindrical air outflow bore 18 is formed in the hollow cylindrical projection 17. An annular groove 19a is formed on the inner end of the air outflow bore 18, and a valve seat 19 is fitted into the annular groove 19a.

Figure 3:
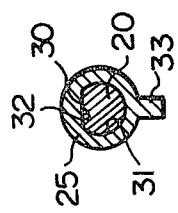
FIG. 3 is a cross-sectional view taken along the line III—III in FIG. 2.
Figure 4:
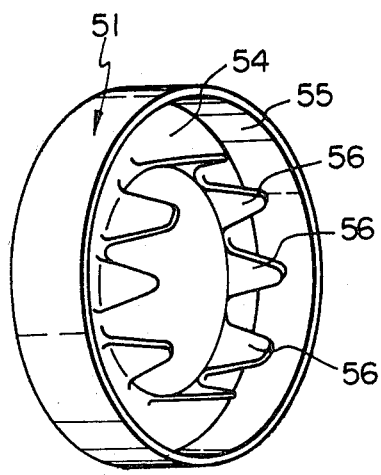
FIG. 4 is a perspective view of a stator core member.
Figure 5:
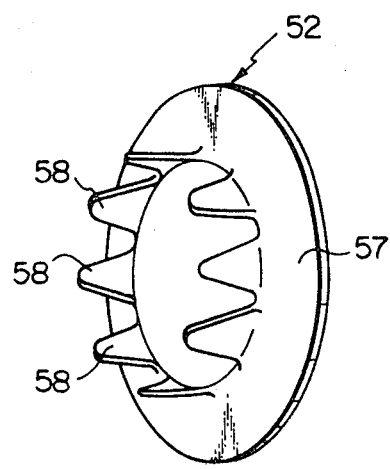
FIG. 5 is a perspective view of a stator core member.

As illustrated in FIG. 2, the stepper motor 9 comprises a valve shaft 20, a rotor 21 coaxially arranged with the valve shaft 20, and a pair of stators 22, 23, each being stationarily arranged in the motor housing 10 and spaced from the cylindrical outer wall of the rotor 21 by a slight distance. The end portion of the valve shaft 20 is supported by a hollow cylindrical bearing 24 made of a sintered metal and fixed onto the motor housing 10, and the intermediate portion of the valve shaft 20 is supported by a hollow cylindrical bearing 25 made of a sintered metal and fixed onto the end plate 11. A first stop pin 26, which abuts against the rotor 21 when the valve shaft 20 reaches the most advanced position, is fixed onto the valve shaft 20, and a second stop pin 27, which abuts against the rotor 21 when the valve shaft 20 reaches the most retracted position, is fixed onto the valve shaft 20. In addition, an axially extending slot 28, into which the first stop pin 26 is able to enter, is formed in the bearing 24. External screw threads 29 are formed on the outer circumferential wall of the valve shaft 20, which is located within the motor housing 10. The external screw threads 29 extend towards the right in FIG. 2 from the left end of the valve shaft 20 and terminate at a position wherein the valve shaft 20 passes through the second stop pin 27 by a slight distance. In addition, an axially extending flat portion 30, which extends towards the right in FIG. 2 from a position near the terminating position of the external screw threads 29, is formed on the outer circumferential wall of the valve shaft 20. As illustrated in FIG. 3, the inner wall of the shaft bearing hole of the bearing 25 comprises a cylindrical wall portion 31 and a flat wall portion 32 which have a complementary shape relative to the outer circumferential wall of the valve shaft 20. Consequently, the valve shaft 20 is supported by the bearing 25 so that the valve shaft 20 cannot be rotated, but is able to slide in the axial direction. In addition, as illustrated in FIG. 3, an outwardly projecting arm 33 is formed in one piece on the outer circumferential wall of the bearing 25, and a bearing receiving hole 34 (FIG. 2), having a contour shape which is the same as that of the bearing 25, is formed on the inner wall of the end plate 11. Consequently, when the bearing 25 is fitted into the bearing receiving hole 34, as illustrated in FIG. 2. The bearing 25 is non-rotatably supported by the end plate 11. A valve head 36, having a substantially conical shaped outer wall 35, is secured onto the tip of the valve shaft 20 by means of a nut 37, and an annular air flow passage 38 is formed between the valve seat 19 and the conical outer wall 35 of the valve head 36. In addition, a compression spring 39 is inserted between the valve head 36 and the end plate 11 in the valve chamber 15.

As illustrated in FIG. 2, the rotor 21 comprises a hollow cylindrical inner body 40 made of a synthetic resin, a hollow cylindrical intermediate body 41 made of a metallic material and rigidly fitted onto the outer circumferential wall of the hollow cylindrical inner body 40, and a hollow cylindrical outer body 42 made of a permanent magnet and fixed onto the outer circumferential wall of the hollow cylindrical intermediate body 41 by using an adhesive. As will be hereinafter described, an N pole and an S pole are alternately formed on the outer circumferential wall of the hollow cylindrical outer body 42 made of a permanent magnet along the circumferential direction of the outer circumferential wall of the hollow cylindrical outer body 42. As illustrated in FIG. 2, one end of the hollow cylindrical intermediate body 41 is supported by the inner race 44 of a ball bearing 43 which is supported by the motor housing 10, and the other end of the hollow cylindrical intermediate body 41 is supported by the inner race 46 of a ball bearing 45 which is supported by the end plate 11. Consequently, the rotor 21 is rotatably supported by a pair of the ball bearings 43 and 45. Internal screw threads 47, which are in engagement with the external screw threads 29 of the valve shaft 20, are formed on the inner wall of the central bore of the hollow cylindrical inner body 40. Therefore, when the rotor 21 rotates, the valve shaft 20 is caused to move in the axial direction.

The stators 22 and 23, which are stationarily arranged in the motor housing 10, have the same construction and, therefore, the construction of only the stator 22 will be hereinafter described with reference to FIGS. 4 through 7. Referring to FIGS. 4 through 7, the stator 22 comprises a pair of stator core members 51 and 52, and a stator coil 53. The stator core member 51 comprises an annular side wall portion 54, an outer cylindrical portion 55, and eight pole pieces 56 extending perpendicular to the annular side wall portion 54 from the inner periphery of the annular side wall portion 54. The pole pieces 56 have a substantially triangular shape, and each of the pole pieces 56 is spaced from the adjacent pole piece 56 by the same angular distance. On the other hand, the stator core member 52 comprises an annular side wall portion 57 and eight pole pieces 58 extending perpendicular to the annular side wall portion 57 from the inner periphery of the annular side wall portion 57. The pole pieces 58 have a substantially triangular shape, and each of the pole pieces 58 is spaced from the adjacent pole piece 58 by the same angular distance. The stator core members 51 and 52 are assembled so that each of the pole pieces 56 is spaced from the adjacent pole pieces 58 by the same angular distance as illustrated in FIGS. 6 and 7. When the stator core members 51 and 52 are assembled, the stator core members 51 and 52 construct a stator core. When an electric current is fed into the stator coil 53 and flows within the stator coil 53 in the direction illustrated by the arrow A in FIG. 7, a magnetic field, the direction of which is as illustrated by the arrow B in FIG. 6, is generated around the stator coil 53. As a result of this, the S poles are produced in the pole pieces 56 and, at the same time, the N poles are produced in the pole pieces 58. Consequently, it will be understood that an N pole and an S pole are alternately formed on the inner circumferential wall of the stator 22. On the other hand, if an electric current flows within the stator coil 22 in the direction which is opposite to that illustrated by the arrow A in FIG. 7, the N poles are produced in the pole pieces 56 and, at the same time, the S poles are produced in the pole pieces 58.

Figure 8:
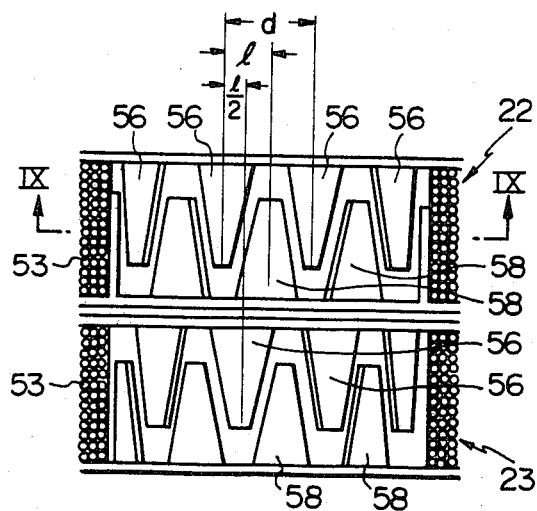
FIG. 8 is a cross-sectional plan view of the stator illustrated in FIG. 2.
Figure 9:
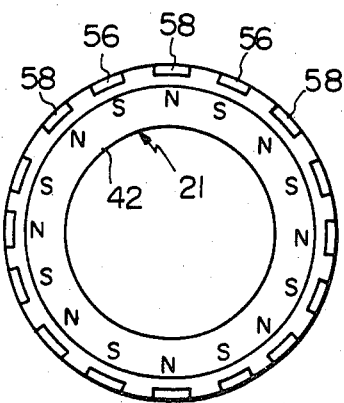
FIG. 9 is a schematic cross-sectional side view taken along the line IX—IX in FIG. 8.

FIG. 8 illustrates the case wherein the stator 22 and the stator 23 are arranged in tandem as illustrated in FIG. 2. In FIG. 8, similar components of the stator 23 are indicated with the same reference numerals used in the stator 22. As illustrated in FIG. 8, assuming that the distance between the pole piece 56 of the stator 22 and the adjacent pole piece 58 of the stator 22 is indicated by 1, each of the pole pieces 56 of the stator 23 is offset by 1/2 from the pole piece 56 of the stator 22, which is arranged nearest to the pole piece 56 of the stator 23. That is, assuming that the distance d between the adjacent pole pieces 56 of the stator 23 is one pitch, each of the pole pieces 56 of the stator 23 is offset by a ¼ pitch from the pole piece 56 of the stator 22, which is arranged nearest to the pole piece 56 of the stator 23. On the other hand, as illustrated in FIG. 9, the N pole and the S pole are alternately formed on the outer circumferential wall of the hollow cylindrical outer body 42 of the rotor 21 along the circumferential direction of the outer circumferential wall of the hollow cylindrical outer body 42, and the distance between the N pole and the S pole, which are arranged adjacent to each other, is equal to the distance between the pole piece 56 and the pole piece 58 of the stator 22 or 23, which are arranged adjacent to each other.

Turning to FIG. 1, the stepper motor 9 is connected to an electric control unit 61 via a stepper motor drive circuit 60. In addition, a vehicle speed sensor 62, a cooling water temperature sensor 63, an engine speed sensor 64, a throttle switch 65, a neutral switch 66 of the automatic transmission (not shown) and a lubricating oil pressure reactive switch 67 are connected to the electronic control unit 61. The vehicle speed sensor 62 comprises, for example, a rotary permanent magnet 68 arranged in the speed meter (not shown) and rotated by the speed meter cable (not shown), and a reed switch 69 actuated by the rotary permanent megnet 68. A pulse signal, having a frequency which is proportional to the vehicle speed, is input into the electronic control unit 61 from the vehicle speed sensor 62. The cooling water temperature sensor 63 is provided for detecting the cooling water of the engine, and a signal, representing the temperature of the cooling water, is input into the electronic control unit 61 from the cooling water temperature sensor 63. The engine speed sensor 64 comprises a rotor 71 rotating in a distributor 70 in synchronization with the rotation of the crank shaft (not shown), and an electromagnetic pick-up 72 arranged to face the saw tooth shaped outer periphery of the rotor 71. A pulse is input into the electronic control unit 61 from the engine speed sensor 64 everytime the crank shaft rotates at a predetermined angle. The throttle switch 65 is operated by the rotating motion of the throttle valve 4 and turned to the ON position when the throttle valve 4 is fully closed. The operation signal of the throttle switch 65 is input into the electronic control unit 61. The neutral switch 66 is provided for detecting whether the automatic transmission is in the drive range D or in the neutral range N, and the detecting signal of the neutral switch 66 is input into the electronic control unit 61.

Figure 11:
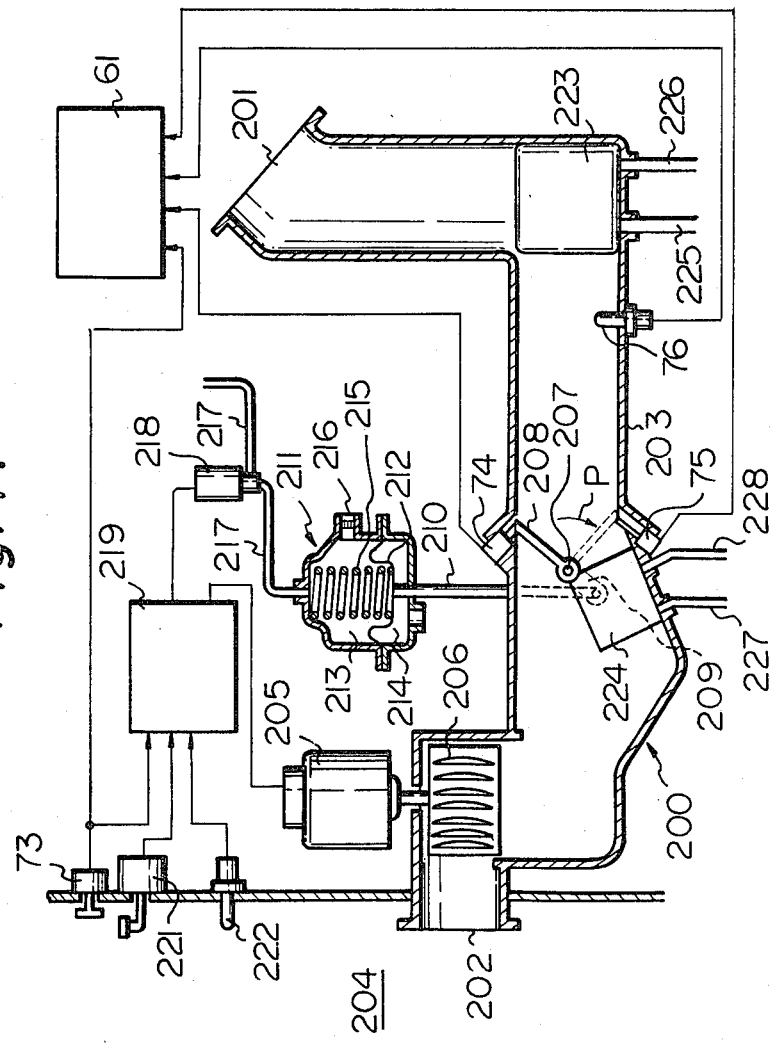
FIG. 11 is a schematic view of an air conditioning device.

FIG. 11 illustrates an air conditioning device 200. Referring to FIG. 11, the air conditioning device 200 comprises an air duct 203 having an air inlet 201 and an air outlet 202. The air inlet 201 is open to the atmosphere, and the air outlet 202 is open to a driver's compartment 204. A fan 206, driven by a motor 205, is arranged in the air duct 203 and, when the fan 206 is rotated, ambient air, sucked into the air duct 203 from the air inlet 201, is discharged into the driver's compartment 204 from the air outlet 202. In addition, an air mix damper 208, fixed onto a swing shaft 207, is arranged in the air duct 203. An arm 209 is fixed onto the swing shaft 207, and the tip of the arm 209 is connected to a diaphragm 212 of a vacuum diaphragm apparatus 211 via a control rod 210. The vacuum diaphragm apparatus 211 comprises a vacuum chamber 213 and an atomspheric pressure chamber 214 which are separated by a diaphragm 212, and a compression spring 215 for biasing the diaphragm 212 towards the atmospheric pressure chamber 214 is arranged in the vacuum chamber 213. The vacuum chamber 213 is connected, on one hand, to the atmosphere via a restricted opening 216 and, on the other hand, to the surge tank 2 (FIG. 1) via a vacuum conduit 217 and an electromagnetic valve 218. As illustrated in FIG. 11, the electromagnetic valve 218 is connected to the output terminal of an electronic control unit 219 for the air conditioning device 200. In addition, an air conditioning switch 73, a driver's compartment temperature setting device 221 and a driver's compartment temperature sensor 222 are connected to the input terminals of the electronic control unit 219. Continuous pulses are applied to the solenoid of the electromagnetic valve 218 from the electronic control unit 219, and the opening time duration of the electromagnetic valve 218 is increased as the duty cycle of the continuous pulses is increased. On the other hand, an evaporator 223 for cooling air and a heat exchanger 224 for heating air are arranged in the air duct 203. Coolant is fed via a coolant inflow conduit 225 into the evaporator 223 from a compressor (not shown) driven by the engine and, then, the coolant is returned to the compressor via a coolant outflow conduit 226 after the coolant absorbs heat from air flowing within the air duct 203. On the other hand, cooling water of the engine is fed into the heat exchanger 224 via a cooling water inflow conduit 227 and, then, the cooling water is returned to the radiator (not shown) via a cooling water outflow conduit 228 after the cooling water provides heat for air flowing within the air duct 203.

When the air conditioning switch 73 is turned to the ON position, the motor 225 is rotated, and the opening control of the electromagnetic valve 218 is started. As mentioned above, the opening time duration of the electromagnetic valve 218 is increased as the duty ratio of the continuous pulse applied to the electromagnetic valve 218 is increased. Consequently, the level of vacuum produced in the vacuum chamber 213 becomes great as the duty cycle of the continuous pulses is increased. If the level of vacuum produced in the vacuum chamber 213 becomes great, since the diaphragm 212 moves upwards against the compression spring 215, the air mix damper 208 is rotated in the direction illustrated by the arrow P in FIG. 11 As a result of this, since the amount of air passing through the heat exchanger 224 is reduced, the temperature of air fed into the driver's compartment 204 becomes low. Contrary to this, if the duty cycle of the continuous pulses applied to the electromagnetic valve 218 is reduced, since the opening time duration of the electromagnetic valve 218 is reduced, the level of vacuum produced in the vacuum chamber 213 becomes small. As a result of this, since the diaphragm 212 moves downwards, the air mix damper 208 is rotated in the direction which is opposite to the direction P. Therefore, since the amount of air passing through the heat exchanger 224 is increased, the temperature of air fed into the driver's compartment 204 is increased. The position of the air mix damper 208 is controlled by the driver's compartement temperature setting device 221 so that the temperature in the driver's compartment 204, which is set by the driver, becomes equal to the actual temperature in the driver's compartment 204, which is detected by the driver's compartment temperature sensor 222.

As illustrated in FIG. 11, a hot max. switch 74 and a cool max. switch 75 are arranged in the air duct 203. When the air mix damper 208 is located at a position illustrated by the solid line in FIG. 11, the hot max. switch 74 comes into engagement with the air mix damper 208 and is turned to the ON position. When the air mix damper 208 is located in the position illustrated by the solid line in FIG. 11, the entire air, flowing within the air duct 203, passes through the heat exchanger 224. Consequently, when air, fed into the driver's compartment 204 via the air duct 203, is heated to the maximum, the hot max. switch 74 is turned to the ON position. At this time, the evaporator 223 serves to dehumidify air flowing within the air duct 203. On the other hand, when the air mix damper 208 is located in the position illustrated by the broken line in FIG. 11, the cool max. switch 75 comes into engagement with the air mix damper 208 and is turned to the ON position. When the air mix damper 208 is located in the position illustrated by the broken line in FIG. 11, the entire air, flowing within the air duct 203, is cooled by the evaporator 223 without being heated by the heat exchanger 224. Consequently, when air, fed into the driver's compartment 204 via the air duct 203, is cooled to the maximum, the cool max. switch 75 is turned to the ON position. In addition, a temperature sensor 76 for detecting the temperature of air which has passed through the evaporator 223 is arranged in the air duct 203 at a position located near and downstream of the evaporator 223. As illustrated in FIG. 11, the air conditioning switch 73, the hot max. switch 74, the cool max. switch 75 and the temperature sensor 76 are connected to the electronic control unit 61.

Figure 10B:
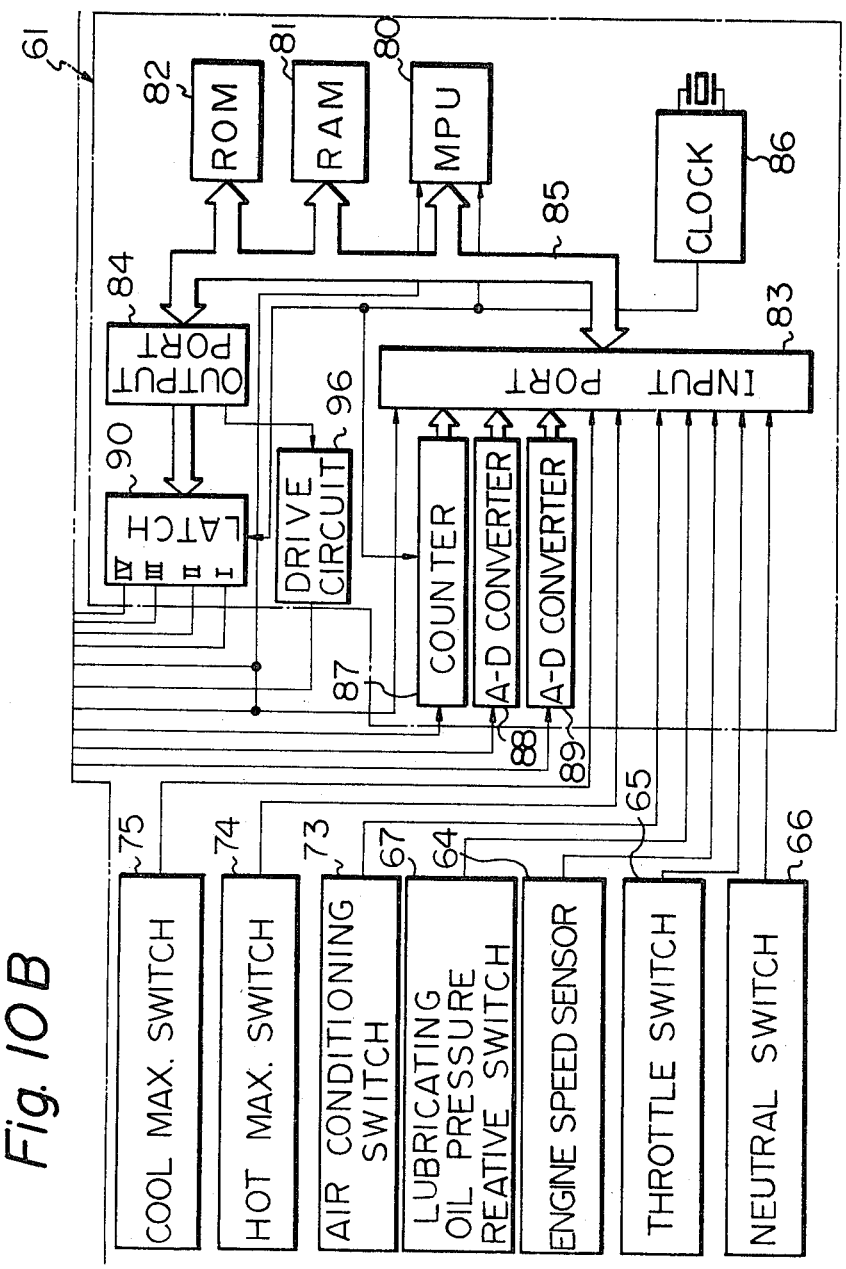

FIG. 10 illustrates the stepper motor drive circuit 60 and the electronic control unit 61. Referring to FIG. 10, the electronic control unit 61 is constructed as a digital computer and comprises a microprocessor (MPU) 80 executing the arithmetic and logic processing, a random-access memory (RAM) 81, a read-only memory (ROM) 82 storing a predetermined control program and an arithmetic constant therein, an input port 83 and an output port 84 are all interconnected to each other via a bidirectional bus 85. In addition, the electronic control unit 61 comprises a clock generator 68 generating various clock signals. Furthermore, the electronic control unit 61 comprises a counter 87, and the vehicle speed sensor 62 is connected to the input port 83 via the counter 87. The number of output pulses issued from the vehicle speed sensor 62, is counted for a fixed time period in the counter 87 determined by the clock signal of the clock generator 86, and the binary coded count value, which is proportional to the vehicle speed, is input into the MPU 80 via the input port 83 and the bus 85 from the counter 87. In addition, the electronic control unit 61 comprises a pair of A-D converters 88, 89. The cooling water temperature sensor 63 is connected to the input port 83 via the A-D converter 88, and the temperature sensor 76 is connected to the input port 83 via the A-D converter 89. The cooling water temperature sensor 63 comprises, for example, a thermistor elememt and produces an output voltage which is proportional to the temperature of the cooling water of the engine. The output voltage of the cooling water temperature sensor 63 is converted to the corresponding binary code in the A-D converter 88, and the binary code is input into the MPU 80 via the input port 83 and the bus 85. The temperature sensor 76 also comprises, for example a thermistor element and produces an output voltage which is proportional to the temperature of air flowing within the air duct 203 located downstream of the evaporator 223. The output voltage of the temperature sensor 76 is converted to the corresponding binary code in the A-D converter 89, and the binary code is input into the MPU 80 via the input port 83 and the bus 85. The output signals of the cool max. switch 75, the hot max. switch 74, the air conditioning switch 73, the lubricating oil pressure reactive switch 67, the engine speed sensor 64, the throttle switch 65 and the neutral switch 66 are input into the MPU 80 via the input port 83 and the bus 85. In the MPU 80, the time interval of the output pulses issuing from the engine speed sensor 64 is calculated, and the engine speed is calculated from the time interval. On the other hand, the output terminals of the output port 84 are connected to the corresponding input terminals of the latch 90, and the output terminals of the latch 92 are connected to the stepper motor drive circuit 60. Stepper drive data, obtained in the MPU 80, is written in the output port 84, and the stepper motor drive data is retained in the latch 90 for a fixed time period determined by the clock signal of the clock generator 86. The power source terminal of the electronic control unit 61 is connected to a power source 94 via an ignition switch 91 and the switch 93 of a relay 92, which are arranged in parallel. The switch 93 is actuated by the coil 95 of the relay 92. One of the ends of the coil 95 is connected to the power source 94, and the other end of the coil 95 is connected to the output port 84 via a drive circuit 96. In addition, the opening and closing operation of the ignition switch 91 is input into the MPU 80 via the input port 83 and the bus 85.

On the other hand, in FIG. 8, the stator coil 53 of the stator 22 is wound in the direction which is the same as the winding direction of the stator coil 53 of the stator 23. In FIG. 10, the winding start terminals of the stator coils 53 of the stators 22 and 23 are indicated by $S_1$ and $S_2$, respectively, and the winding end terminals of the stator coils 53 of the stators 22 and 23 are indicated by $E_1$ and $E_2$, respectively. In addition, in FIG. 10, the intermediate taps of the stator coils 53 of the stators 22 and 23 are indicated by $M_1$ and $M_2$, respectively. In the stator 22, the stator coil 53, located between the winding start terminal $S_1$ and the intermediate tap $M_1$, constitutes a first phase exciting coil I, and the stator coil 53, located between the winding end terminal $E_1$ and the intermediate tap $M_1$, constitutes a second phase exciting coil II. In addition, in the stator 23 the stator coil 53, located between the winding start terminal $S_2$ and the intermediate terminal $M_2$, constitutes a third phase exciting coil III, and the stator coil 53, located between the winding end terminal $E_2$ and the intermediate tap $M_2$, constitutes a fourth phase exciting coil IV. As illustrated in FIG. 10, the drive control circuit 60 comprises four transistors $Tr_1$, $Tr_2$, $Tr_3$ and $Tr_4$, and the winding start terminals $S_1$ and $S_2$ and the winding end terminals $E_1$ and $E_2$ are connected to the collectors of the transistors $Tr_1$, $Tr_2$, $Tr_3$ and $Tr_4$, respectively. In addition, the intermediate taps $M_1$ and $M_2$ are grounded via a power source 94. The collectors of the transistors $Tr_1$, $Tr_2$, $Tr_3$ and $Tr_4$ are connected to the power source 94 via corresponding diodes $D_1$, $D_2$, $D_3$ and $D_4$ for absorbing a surge current and via a resistor R, and the emitters of the transistors $Tr_1$, $Tr_2$, $Tr_3$ and $Tr_4$ are grounded. In addition, the bases of the transistors $Tr_1$, $Tr_2$, $Tr_3$ and $Tr_4$ are connected to the corresponding output terminals of the latch 92.

Figure 12:
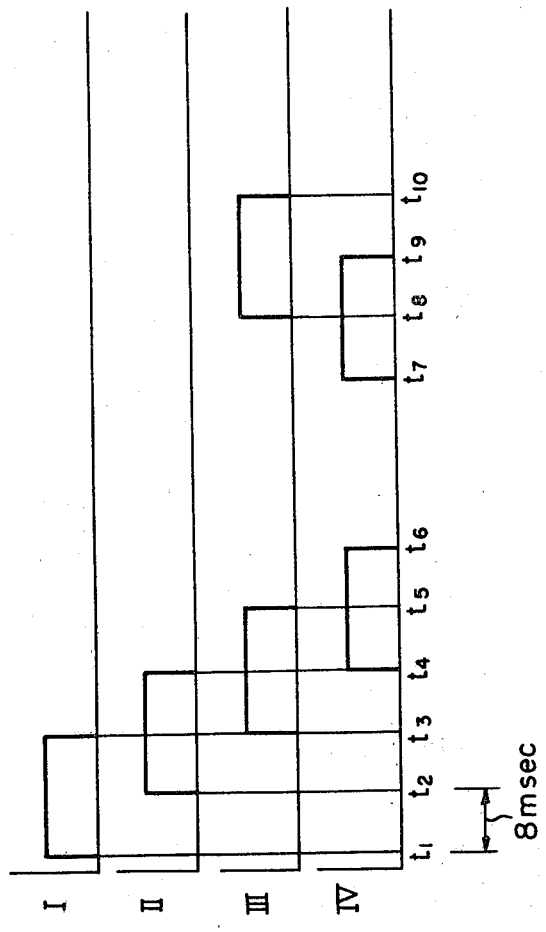
FIG. 12 is a time chart of control pulses of a stepper motor.

As mentioned above, in the MPU 80, the engine speed is calculated on the basis of the output pulses of the engine speed sensor 64. On the other hand, a function, representing a desired relationship between, for example, the temperature of the cooling water of the engine and the engine speed, is stored in the ROM 82 in the form of a formula or a data table. In the MPU 80, the rotating direction of the stepper motor 9, which is necessary to equalize the engine speed to a predetermined engine speed, is determined from the above-mentioned function and the engine speed at which the engine is now driven and, in addition, stepper motor drive data, which is necessary to rotate the stepper motor 9 in a stepping manner in the above-mentioned rotating direction, is obtained. Then, the stepper motor drive data is written in the output port 84. This writing operation of the stepper motor drive data is executed, for example, every 8 msec, and the stepper motor drive data, written in the output port 84, is retained in the latch 90 for 8 msec. For example, four bits of drive data "1000" are input to the output port 84 from the MPU 80 and, if the output terminals of the latch 90, which are connected to the transistors $Tr_1$, $Tr_2$, $Tr_3$ and $Tr_4$, are indicated by I, II, III and IV, respectively, the output signals "1", "0", "0" and "0" are produced at the output terminals I, II, III and IV of the latch 90, respectively, for 8 msec. FIG. 12 illustrates output signals produced at the output terminals I, II, III, IV of the latch 90. From FIG. 12, it will be understood that, during the time period from the time $t_1$ to the time $t_2$, the output signals "1", "0", "0" and "0" are produced at the output terminals I, II, III and IV of the latch 90, respectively. When the output signal, produced at the output terminal I of the latch 90, becomes "1", since the transistor $Tr_1$ is turned to the ON condition, the first phase exciting coil I is excited. Then, at the time $t_2$ in FIG. 12, if it is determined in the MPU 80 that the stepper motor 9 should be moved by one step in the direction wherein the valve body 36 (FIG. 2) opens, the stepper motor drive data "1100" is written in the output port 84. As a result of this, as illustrated in FIG. 12, during the time period from the time $t_2$ to the time $t_3$, the output signals "1", "1", "0" and "0" are produced at the output terminals I, II, III and IV of the latch 90, respectively. Consequently, at this time, the transistor $Tr_2$ is also turned to the ON condition and, thus, the second phase exciting coil II is excited. As in the same manner as described above, during the time period from the time $t_3$ to the time $t_4$ in FIG. 12, since the output signals "0", "1", "1" and "0" are produced at the output terminals I, II, III and IV of the latch 90, respectively, the second phase exciting coil II and the third phase exciting coil III are excited and, during the time period from the time $t_4$ to the time $t_5$ in FIG. 12, since the output signals "0", "0", "1" and "1" are produced at the output terminals I, II, III and IV of the latch 90, respectively, the third phase exciting coil III and the fourth phase exciting coil IV are excited. From FIG. 12, it will be understood that the time duration necessary for the production of the output signals produced at the output terminals I, II, III, IV of the latch 90, that is, the length of time necessary to produce the exciting pulses applied to the exciting coils I, II, III, IV is the same, and that the each length of time necessary to produce the exciting pulses applied to the adjacent two phase exciting coils overlaps by one half as is shown in FIG. 12. An exciting system, in which the time periods of production of the exciting pulses applied to the adjacent two phase exciting coils are overlapped by one half, is called a two-phase exciting system.

Figure 13:
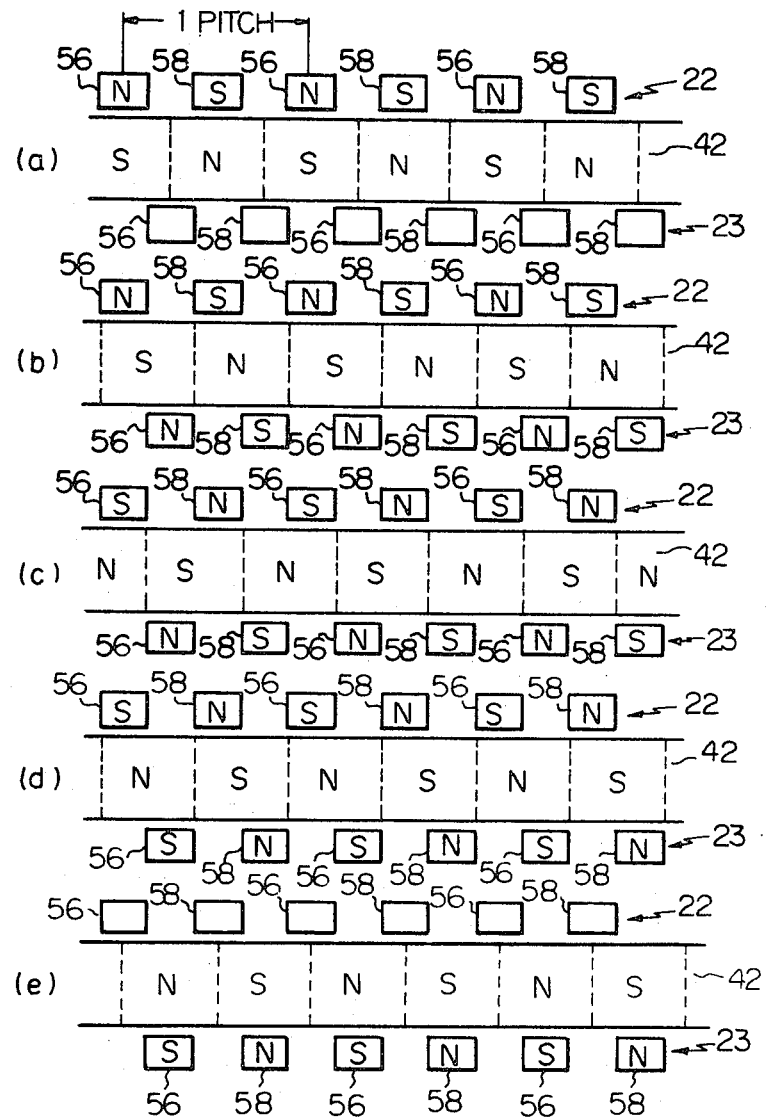
FIG. 13 is a schematically illustrative view of the stator and the rotor of a stepper motor.

FIG. 13 illustrates a schematic developed view of the outer circumferential surface of the hollow cylindrical outer body 42 of the rotor 21 and the pole pieces 56, 58 of the stators 22, 23. FIG. 13 (a) illustrates the case wherein only the first phase exciting coil I is excited as illustrated in FIG. 12 between the time $t_1$ and the time $t_2$. At this time, the polarity of the pole pieces 56 of the stator 22 is N, and the polarity of the pole pieces 58 of the stator 22 is S. Contrary to this, the polarity does not appear on the pole pieces 56, 58 of the stator 23. Consequently, at this time, the rotor 21 remains stopped at a position wherein each of the pole pieces 56 of the stator 22 faces the corresponding S pole of the hollow cylindrical outer body 42, and each of the pole pieces 58 of the stator 22 faces the corresponding N pole of the hollow cylindrical outer body 42. When the second phase exciting coil II is excited, as illustrated between the time $t_2$ and the time $t_3$ in FIG. 12, since the flow direction of the current in the secondary phase exciting coil II is the same as that of the current in the first phase exciting coil I, the polarity of the pole pieces 56 of the stator 23 becomes N, and the polarity of the pole pieces 58 of the stator 23 becomes S, as illustrated in FIG. 13 (b). Consequently, at this time, the hollow cylindrical outer body 42 moves to a position wherein each of the S poles of the hollow cylindrical outer body 42 is located between the corresponding pole pieces 56 of the stator 22 and the corresponding pole pieces 56 of the stator 23, and each of the N poles of the hollow cylindrical outer body 42 is located between the corresponding pole pieces 58 of the stator 22 and the corresponding pole pieces 58 of the stator 23. Therefore, assuming that the distance between the adjacent two pole pieces 56 of the stator 22 is one pitch, as mentioned previously, the hollow cylindrical outer body 42 moves by a ⅛ pitch towards the right in FIG. 13 from a position illustrated in FIG. 13 (a) to a position illustrated in FIG. 13 (b).

After this, when the third phase exciting coil III is excited, as illustrated between the time $t_3$ and the time $t_4$ in FIG. 12, since the flow direction of the current in the third phase exciting coil III is opposite to that of the current in the first phase exciting coil I, the polarity of the pole pieces 56 of the stator 22 becomes S, and the polarity of the pole pieces 58 of the stator 22 becomes N as illustrated in FIG. 13 (c). As a result of this, the hollow cylindrical outer body 42 moves by a ¼ pitch towards the right in FIG. 13 from a position illustrated in FIG. 13 (b) to a position illustrated in FIG. 13 (c). In the same manner as described above, when the fourth phase exciting coil IV is excited, as illustrated between the time $t_4$ and the time $t_5$ in FIG. 12, the hollow cylindrical outer body 42 moves by a ¼ pitch towards the right in FIG. 13 from a position illustrated in FIG. 13 (c) to a position illustrated in FIG. 13 (d). After this, during the time period from the time $t_5$ to the time $t_6$, only the fourth phase exciting coil IV is excited and, thus, the polarity does not appear on the pole pieces 56, 58 of the stator 22 as illustrated in FIG. 13 (e). Consequently, at this time, the hollow cylindrical outer body 42 moves by a ⅛ pitch towards the right in FIG. 13 from a position illustrated in FIG. 13 (d) to a position illustrated in FIG. 13 (e), so that each of the pole pieces 56 of the stator 23 faces the corresponding N pole of the hollow cylindrical outer body 42, and each of the pole pieces 58 of the stator 23 faces the corresponding S pole of the hollow cylindrical body 42. Then, at the time $t_6$ in FIG. 12, the stepper motor drive data "0000" is written in the output port 84 and, thus, since all the output signals, produced at the output terminals I, II, III, IV of the latch 90, become "0", the exciting operation of all the exciting coils I, II, III, IV is stopped. At this time, as illustrated in FIG. 13 (e), each of the pole pieces 56 of the stator 23 faces the corresponding N pole of the hollow cylindrical outer body 42, and each of the pole pieces 58 of the stator 23 faces the corresponding S pole of the hollow cylindrical outer body 42. Consequently, the hollow cylindrical outer body 42 is stationarily retained at a position illustrated in FIG. 13 (e) due to the attracting forces of the N pole and the S pole of the hollow cylindrical outer body 42, which forces act on the pole pieces 56 and the pole pieces 58 of the stator 23, respectively. In addition, an exciting data, indicating that the fourth phase exciting coil IV is excited before that hollow cylindrical outer body 42 is stationarily retained as mentioned above, is stored in a predetermined address in the RAM 81.

At the time $t_7$ in FIG. 12, in the case wherein it is determined in the MPU 80 that the stepper motor 9 should be moved by one step in the direction wherein the valve body 36 (FIG. 2) opens, an exciting data, indicating the phase of the exciting coil which was lastly excited, is read out from the RAM 81 and, if the phase of the exciting coil which was lastly excited is the fourth phase, the stepper motor drive data "0001" is initially written in the output port 84. Consequently, only the fourth phase exciting coil IV is excited as illustrated between the time $t_7$ and the time $t_8$ in FIG. 12. At this time, since the hollow cylindrical outer body 42 is located in a position illustrated in FIG. 13 (e), the hollow cylindrical outer body 42 remains stationary. After this, when the third phase exciting coil III is excited as illustrated, between the time $t_8$ and the time $t_9$, the polarities, as illustrated in FIG. 13 (d) appear on the pole pieces 56, 58 of the stators 22, 23 and, thus, the hollow cylindrical outer body 42 moves by a ⅛ towards the left in FIG. 13 from a position illustrated in FIG. 13 (e) to a position illustrated in FIG. 13 (d).

As illustrated between the time $t_1$ and the time $t_2$ in FIG. 12, when the exciting coils I, II, III, IV are successively excited from the first phase exciting coil I to the fourth phase exciting coil IV, the hollow cylindrical outer body 42 of the rotor 21 moves relative to the stators 22, 23 and, accordingly, the rotor 21 rotates in one direction. When the rotor 21 rotates, since the external screw threads 29 of the valve shaft 20 are in engagement with the internal screw threads 47 of the hollow cylindrical inner body 40, as illustrated in FIG. 2, the valve shaft 20 is caused to move in one direction, for example, towards the left in FIG. 2. As a result of this, since the cross-sectional area of the annular air flow passage 38 formed between the valve head 36 and the valve seat 19 is increased, in FIG. 1, the amount of air fed via the bypass pipe 16 into the surge tank 2 from the intake duct 3 located upstream of the throttle valve 4 is increased. Contrary to this, during the time period between the time $t_7$ and the time $t_{10}$, since the valve shaft 20 is caused to move towards the right in FIG. 2, the cross-sectional area of the annular air flow passage 38 formed between the valve head 36 and the valve seat 19 is reduced.

Figure 14B:
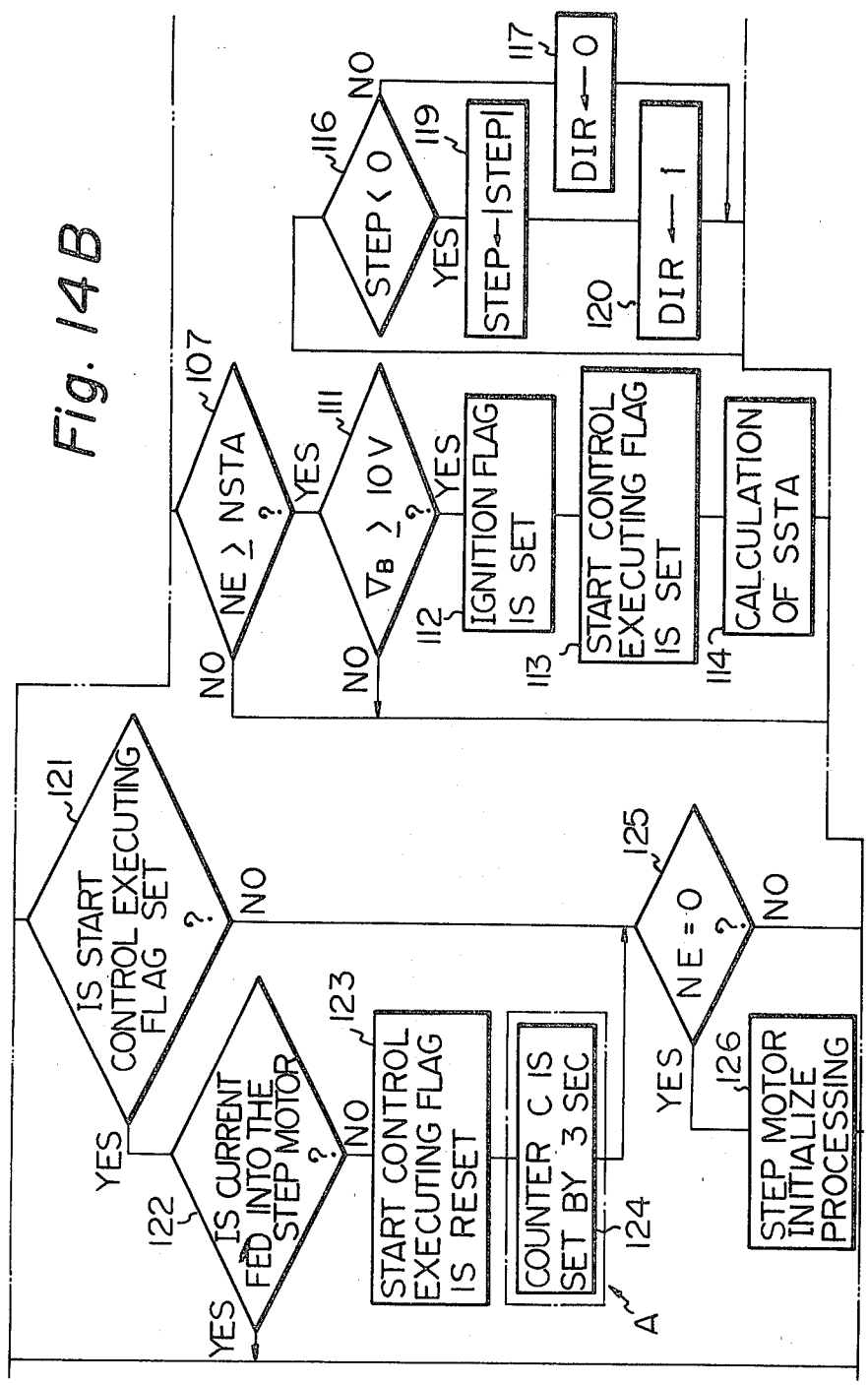
Figure 14C:
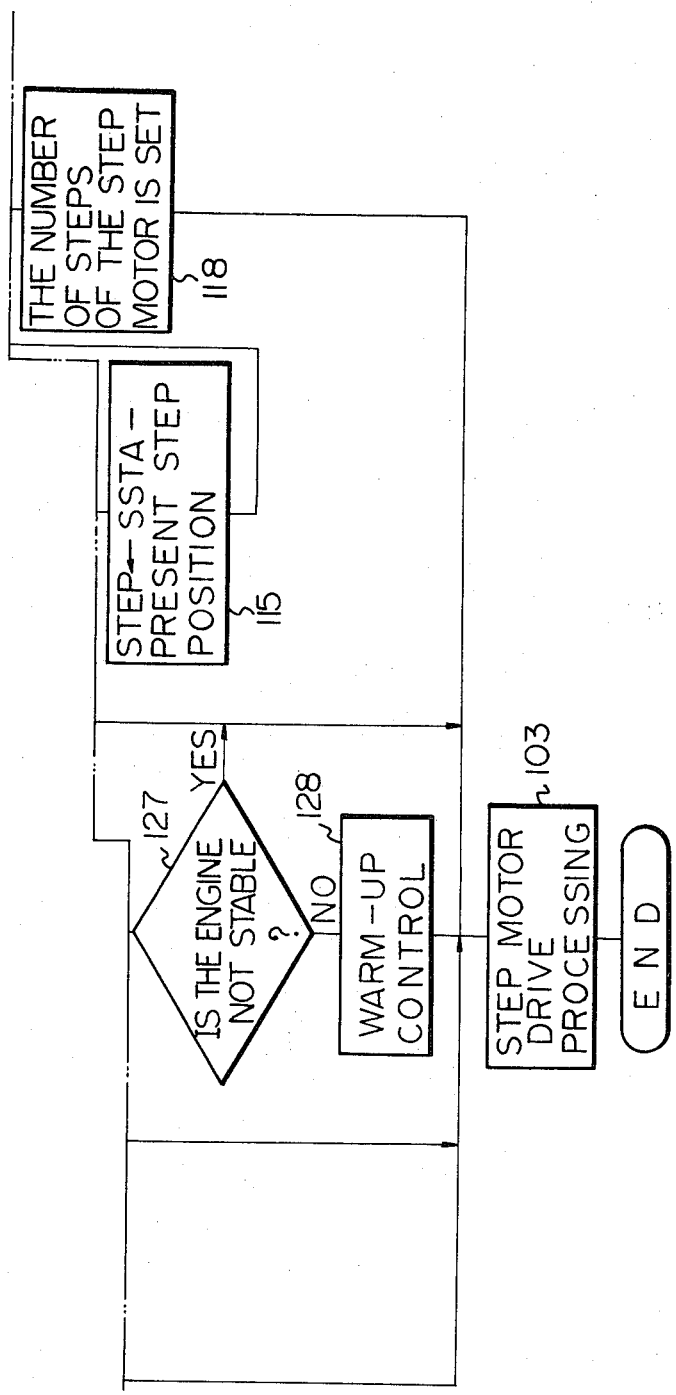
Figure 15B:
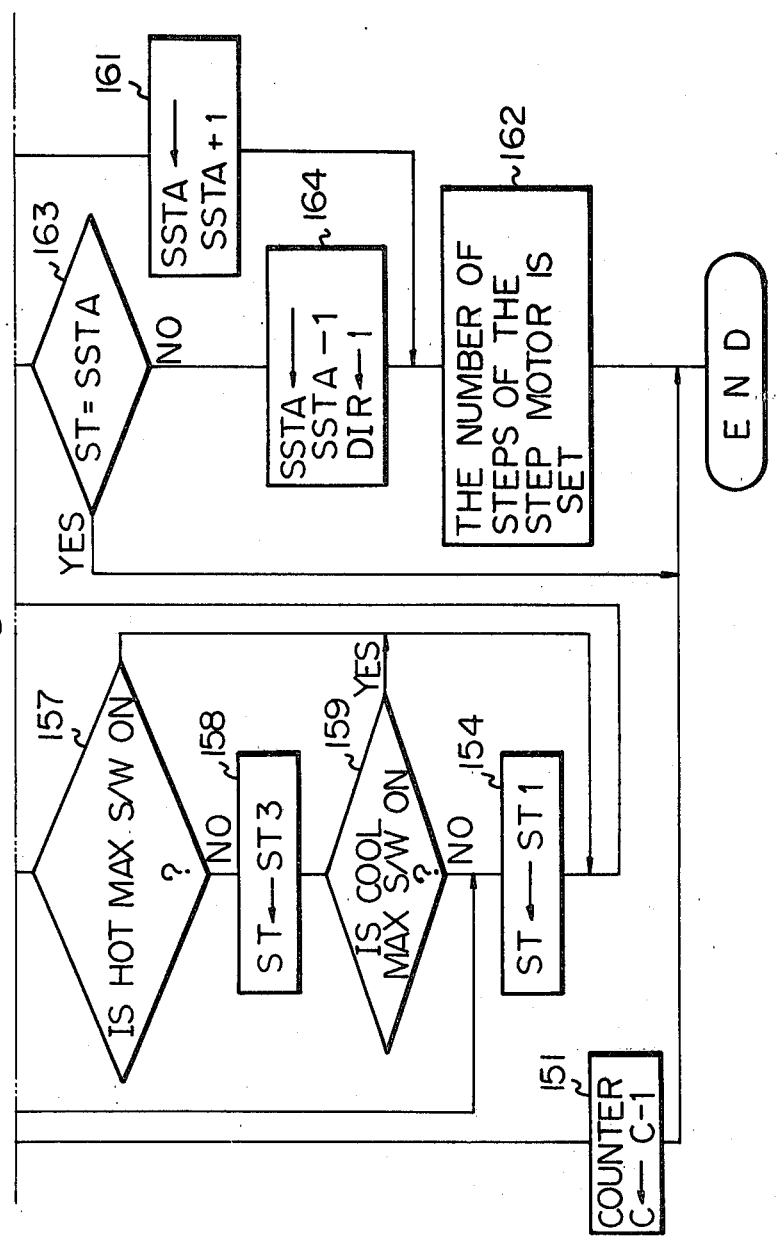
Figure 16:
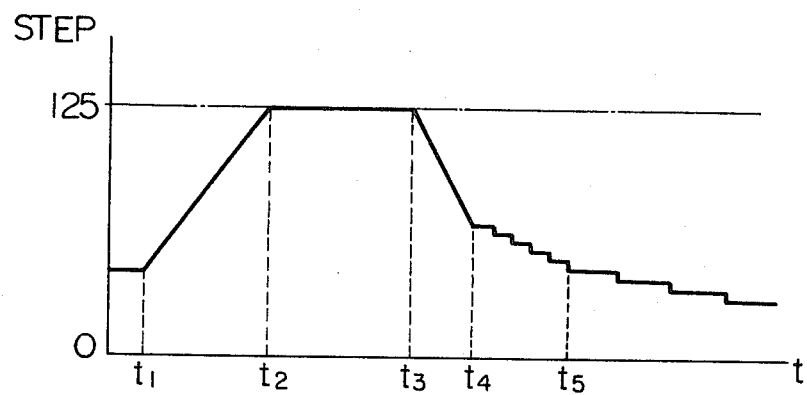
FIG. 16 is a time chart illustrating a change in the step position of a stepper motor.

FIGS. 14 and 15 illustrate flow charts of the operation which is executed when the amount of air flowing within the bypass pipe 16 is controlled, and FIG. 16 illustrates the general behavior of the stepper motor 9. In FIG. 16, the ordinate STEP indicates a stepper position of the step motor 9, and the abscissa t indicates time. In addition, in FIG. 16, 0 of the ordinate STEP indicates that the valve body 36 (FIG. 2) is in the fully closed position, that is, in the extreme right side of FIG. 2, and 125 of the ordinate STEP indicates that the valve body 36 is in the fully opened position, that is, in the extreme left side of FIG. 2. In FIG. 14, step 100 means that the routine is processed by sequential interruptions which are executed periodically at predetermined times. This interruption is executed, for example, every 8 msec. Firstly, in step 101, the operation of the ignition switch 91 is input into the MPU 80 via the input port 83, and it is determined whether the ignition switch 91 is in the ON position. If it is determined in step 101 that the ignition switch 91 is not in the ON position, the initialization processing of the stepper motor 9 is executed. In this initialization processing, the difference between the present step position STEP stored in the RAM 81, and the step position 125 wherein the valve body 36 (FIG. 2) is fully opened is calculated. Then, in step 103, the stepper motor 9 is rotated by a step number corresponding to the above-mentioned difference in the direction wherein the valve body 36 is opened. In addition, in the stepper motor initialize processing in step 102, and during the time the stepper motor drive processing is executed in step 103, current continues to be fed into the coil 95 of the relay 92 and, thereby, the switch 93 of the relay 92 is maintained in the ON position. When the stepper motor drive processing in step 103 is completed, the feeding of current into the coil 95 of the relay 92 is stopped and, thus, the switch 93 is turned to the ON position. Consequently, even if the ignition switch 91 is turned to the OFF position, power is supplied to the electronic control unit 61 via the switch 93 of the relay 92 until the stepper motor 9 is rotated to a position wherein the valve body 36 is fully opened. In FIG. 16, the time $t_1$ indicates the moment when the ignition switch 91 is turned to the OFF condition, and the time $t_2$ indicates the moment when the switch 93 of the relay 92 is turned to the OFF position. Consequently, from FIG. 16, it will be understood that, during the time period from the time $t_1$ to the time $t_2$, the stepper motor 9 is rotated to a step position 125 wherein the valve body 36 (FIG. 2) is fully opened.

Figure 17:
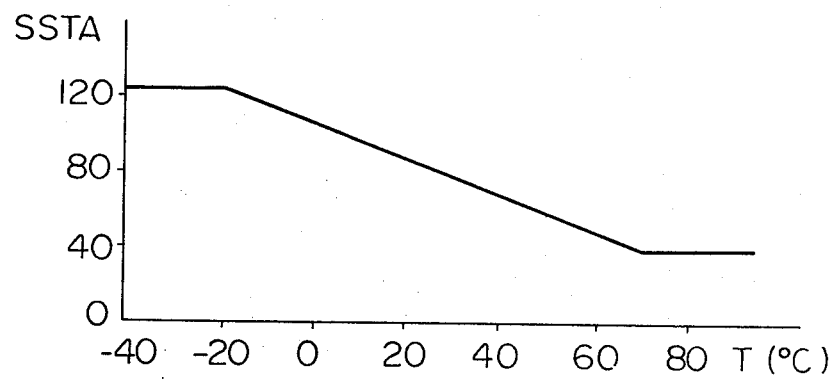
FIG. 17 is a diagram illustrating the relationship between the starting step position of a stepper motor and the temperature of the cooling water of an engine.

If the ignition switch 91 is turned to the ON position a little while after the ignition switch 91 is turned to the OFF position, power is supplied to the electronic control unit 61. At this time, since it is determined in step 101 in FIG. 14 that the ignition switch 91 is in the ON position, it is determined in step 104 whether the ignition flag has been set. At this time, since the ignition flag has not been set, it is determined in step 105 whether the temperature of the cooling water of the engine is not lower than 20° C. on the basis of the output signal of the cooling water temperature sensor 63. If it is determined in step 105 that the temperature of the cooling water of the engine is lower than 20° C., 800 r.p.m. is put into the control starting engine speed NSTA in step 106. On the other hand, if it is determined in step 105 that the temperature of the cooling water of the engine is not lower than 20° C., it is determined in step 108 whether the temperature of the cooling water of the engine is not lower than 70° C. If it is determined in step 108 that the temperature of the cooling water of the engine is lower than 70° C., 500 r.p.m. is put into the control starting engine speed NSTA in step 109. If it is determined in step 108 that the temperature of the cooling water of the engine is not lower than 70° C., 250 r.p.m. is put into the control starting engine speed NSTA in step 110. As mentioned previously, in the MPU 80, the engine speed NE is calculated on the basis of the output signal of the engine speed sensor 64. In step 107, it is determined whether this engine speed NE is not lower than the control starting engine speed NSTA and, if it is determined in step 107 that the engine speed NE is lower than the control starting engine speed NSTA, the stepper motor drive processing is executed in step 103. However, at this time, the stepper motor 9 actually remains stopped. On the other hand, if it is determined in step 107 that the engine speed NE is not lower than the control starting engine speed NSTA, it is determined in step 111 whether the voltage $V_B$ of the power source 94 (FIG. 10) is not lower than 10 volts. If it is determined in step 111 that the voltage $V_B$ of the power source 94 is lower than 10 volts, the stepper motor drive processing is executed in step 103. However, at this time, the stepper motor 9 actually also remains stopped. If it is determined in step 111 that the voltage $V_B$ of the power source 94 is not lower than 10 volts, the ignition flag is set in step 112. After this, the start control executing flag is set in step 113 and then, in step 114, the starting step position SSTA is calculated on the basis of the output signal of the cooling water temperature sensor 63. FIG. 17 illustrates the relationship between the starting step positon SSTA and the temperature T(°C.) of the cooling water of the engine. As will be understood from FIG. 17, the starting step position SSTA is equal to 125 when the temperature of the cooling water of the engine is lower than 20° C.; the staring step position SSTA is reduced as the temperature of the cooling water of the engine is increased from 20° C. to 70° C.; the starting step position SSTA becomes equal to 40 when the temperature of the cooling water of the engine is increased beyond 70° C. The relationship between the starting step position SSTA and the temperature of the cooling water of the engine, which is illustrated in FIG. 17, is stored in the ROM 82 in the form of a function or a data table and, in step 114, the starting step position SSTA is calculated from the above-mentioned function or data table. Then, in step 115, the present step position is subtracted from the starting step position SSTA, and the result of the subtraction is input into the step number STEP. Then, in step 116, it is determined whether the step number STEP is negative and, if it is determined in step 116 that the step number STEP is not negative, "0" is put into the stepper motor rotating direction DIR in step 117. After this, in step 118, the stepper motor rotating direction DIR and the step number STEP to be moved are stored in a predetermined address in the RAM 81. In FIG. 14, DIR=0 indicates the stepper motor rotating direction wherein the valve body 36 (FIG. 2) is moved towards the opening position, and DIR=1 indicates the stepper motor rotating direction wherein the valve body 36 is moved towards the closed position. On the other hand, if it is determined in step 116 that the step number STEP is negative, the absolute value of the step number STEP is put into the step number STEP in step 119. After this, in step 120, "1" is put into the stepper motor rotating direction DIR and, then, in step 118, the stepper motor rotating direction DIR and the step number STEP to be moved are stored in a predetermined address in the RAM 81. Then, in step 103, the stepper motor rotating direction DIR and the step number STEP to be moved are read out from the RAM 81 and written in the output port 84 and, as a result, the stepper motor 9 begins to rotate by the step number STEP in the stepper motor rotating direction DIR.

In the next processing cycle, in step 104, it is again determined whether the ignition flag has been set. At this time, if the ignition flag has been set in step 112 in the preceding processing cycle, it is determined in step 121 whether the start control executing flag is set. If the start control executing flag has been set in step 113 in the preceding processing cycle, since it is determined in step 121 that the start control executing flag has been set, it is determined in step 122 whether the stepper motor 9 is now rotating towards the starting step position SSTA. If it is determined in step 122 that the stepper motor 9 is now rotating towards the starting step position SSTA, the rotating operation of the stepper motor 9 is caused to continue in step 103. In FIG. 16, the time $t_3$ indicates the moment when the stepper motor 9 begins to rotate towards the starting step position SSTA, and the time $t_4$ indicates that the stepper motor 9 reaches the starting step position SSTA. Consequently, during the time period from the time $t_3$ to the time $t_4$ in FIG. 16, since it is determined in step 122 in FIG. 14 that the stepper motor 9 is now rotating towards the starting step position SSTA, the stepper motor drive processing is executed in step 103. At this time, the exciting coils I, II, III, IV of the stepper motor 9 are successively excited every 8 msec as illustrated in FIG. 12. On the other hand, if the time reaches the time $t_4$ in FIG. 16, since the rotating operation of the stepper motor 9 is stopped, it is determined in step 122 that the stepper motor 9 is not now rotating. At this time, in step 123, the start control executing flag is reset and, then, in step 124, the counter C is set by 3 sec. As mentioned above, since the interruptions are executed every 8 msec in the routine illustrated in FIG. 14, the operation of setting the counter C by 3 sec means that the numeral 375 (=3 sec/8 msec) is put into the counter C. Then, in step 125 it is determined whether the engine speed NE is equal to zero. If it is determined in step 125 that the engine speed NE is equal to zero, that is, when the engine stalls, the stepper motor initialization processing, which is the same as that in step 102, is executed in step 126. On the other hand, if it is determined in step 125 that the engine speed NE is not equal to zero, it is determined in step 127 whether the engine is operating under unstable operating conditions. That is, in step 127, it is determined whether the engine speed NE is now increasing or decreasing on the basis of the engine speed NE calculated in the MPU 80, and it is determined that the engine is operating under an unstable operating condition when the engine speed NE is now increasing and higher than 500 r.p.m. and when the engine speed NE is now decreasing and lower than 300 r.p.m. If it is determined in step 127 that the engine is operating under an unstable operating condition, the stepper motor drive processing is executed in stepper 103. However, at this time, actually, the stepper motor 9 actually remains stopped. On the other hand, when the engine speed NE is increasing and lower than 500 r.p.m., and when the engine speed NE is decreasing and higher than 300 r.p.m., since it is determined in step 127 that the engine is operating under a stable operating condition, the warm-up control is executed in step 128. In the next processing cycle, if the start control executing flag has been reset, the process jumps to step 125 from step 121. At this time, if the engine speed NE is not equal to zero and, in addition, the engine is operating under a stable operating condition, the warm-up control is executed in step 128.

Figure 18:
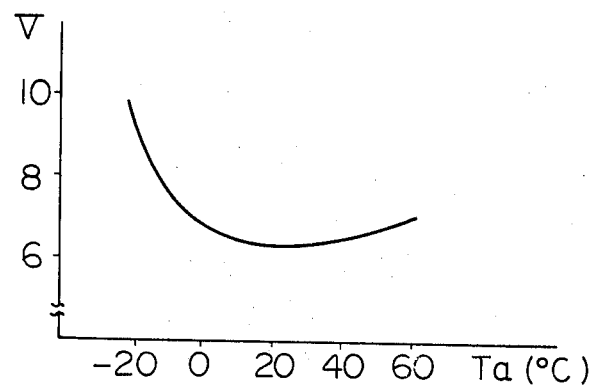
FIG. 18 is a diagram illustrating the relationship between the temperature of the cooling water of an engine and the voltage which is necessary to start a stepper motor.

As will be understood from FIG. 14, when it is determined in step 107 that the engine speed NE is not lower than the control starting engine speed NSTA, and when the voltage $V_B$ of the power source 84 is not lower than 10 volts, the stepper motor rotating direction DIR and the step number STEP to be moved are stored in a predetermined address in the RAM 81 and, then, in step 103, the rotating operation of the stepper motor 9 is started. In addition, from steps 105, 106, 108, 109 and 110, it will be understood that the control starting engine speed NSTA is increased as the temperature of the cooling water of the engine is reduced. Referring to FIG. 18, the ordinate V indicates voltage which is necessary to start the rotating motion of the stepper motor 9, and the abscissa $T_a$ indicates the temperature of ambient air prevailing around the stepper motor 9. As will be understood from FIG. 18, the voltage V which is necessary to start the rotating motion of the stepper motor 9 is increased as the temperature $T_a$ of ambient air is reduced. Consequently, if the rotating motion of the stepper motor 9 is started when the temperature $T_a$ of ambient air is low, for example, below 0° C., since the voltage V necessary to start the rotating motion of the stepper motor 9 is high as illustrated in FIG. 18, the voltage $V_B$ of the power source 94 will be reduced. In order to prevent the voltage $V_B$ of the power source 94 from being reduced, it is necessary to increase the charging current for the power source 94 by increasing the engine speed when the rotating motion of the stepper motor 9 is started. The temperature $T_a$ of ambient air is increased as the temperature of the cooling water of the engine is increased. Consequently, as will be understood from steps 105 through 110 in FIG. 14, when the temperature of the cooling water of the engine is low, the control starting engine speed NSTA is increased to prevent the voltage $V_B$ of the power source 94 from being reduced.

Figure 19:
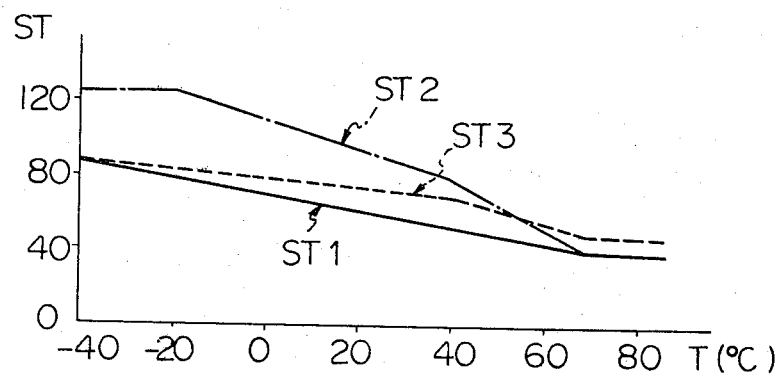
FIG. 19 is a diagram illustrating the relationship between the warm-up step positions of a stepper motor and the temperature of the cooling water of an engine.

As mentioned above, when the step position of the stepper motor 9 reaches the starting step position SSTA (FIG. 17), the warm-up control is started in step 128 in FIG. 14. The warm-up control will be hereinafter described with reference to FIG. 15. Referring to FIG. 15, firstly, in step 150, it is determined whether the content of the counter C is equal to zero. As described above, in step 124 in FIG. 14, this counter C has been set by 3 sec and, therefore, during 3 sec after the warm-up control is started, "C-1" continues to be put into "C", that is, the content of the counter C continues to be decremented by one in step 151 in FIG. 14. Then, in step 103 in FIG. 14, the step motor drive processing is executed. However, at this time, the stepper motor 9 actually remains stationary. When 3 sec has passed after the warm-up control is started, the counter C is set by 3 sec in step 152 in FIG. 15 and then it is determined in step 153 whether the air conditioning switch 73 is in the ON position on the basis of the output signal of the air conditioning switch 73. If it is determined in step 153 that the air conditioning switch 73 is not in the ON position, ST1 is put into the warm-up step position ST which indicates a step position to be followed during the warm-up of the engine. On the other hand, if it is determined in step 153 that the air conditioning switch 73 is in the ON position, ST2 is put into the warm-up step position ST and then it is determined in step 157 whether the hot max. switch 74 is in the ON position on the basis of the output signal of the hot max. switch 74. If it is determined in step 157 that the hot max. switch 74 is in the ON position, the process goes to step 155. Contrary to this, if it is determined in step 157 that the hot max. switch 74 is not in the ON position, ST3 is put into the warm-up step position ST in step 158 and then it is determined in step 159 whether the cool max. switch 75 is in the ON position on the basis of the cool max. switch 75. If it is determined in step 159 that the cool max. switch 75 is in the ON position, the process goes to step 155. Contrary to this, if it is determined in step 159 that the cool max. switch 75 is not in the ON position, ST1 is put into the warm-up step position ST in step 154 and then the process goes to step 155. Consequently, ST1 is put into the warm-up step position ST when the air conditioning switch 73 is not in the ON position, or when the air conditioning switch 73 is in the ON position, but both the hot max. switch 74 and the cool max. switch 75 are not in the ON position. In addition, ST2 is put into the warm-up step position ST when the air conditioning switch 73 is in the ON position and when the hot max. switch 74 is in the ON position. Furthermore, ST3 is put into the warm-up step position ST when the air conditioning switch 73 is in the ON position and when the cool max. switch 75 is in the ON position. FIG. 19 illustrates changes in the above-mentioned ST1, ST2 and ST3. As illustrated in FIG. 19, the warm-up step position ST1 is equal to about 90 when the temperature T of the cooling water of the engine is about 40° C.; the warm-up step position ST1 is gradually reduced as the temperature T of the cooling water of the engine is increased; the warm-up step position ST1 becomes equal to about 40 when the temperature T of the cooling water of the engine becomes 70° C. In addition, the warm-up step position ST2 is much larger than the warm-up step position ST1 when the temperature T of the cooling water of the engine is within a range between −40° C. and 40° C., and the warm-up step position ST2 gradually approaches the warm-up step position ST1 during the time the temperature T of the cooling water of the engine is increased to 70° C. from 40° C. Furthermore, the warm-up step position ST3 is gradually reduced as the temperature T of the cooling water of the engine is increased, but the warm-up step position ST3 is slightly larger than the warm-up step position ST1. The warm-up step positions ST1, ST2 and ST3 are stored in the ROM 82 (FIG. 10) in the form of a function of the cooling water temperature as illustrated in FIG. 19, or in the form of a data table and, therefore, in steps 154, 156 and 158, the warm-up step position ST1, ST2 and ST3 are read out from the ROM 82, respectively, and put into the warm-up step position ST.

In step 155, "1" is put into the step number STEP of the stepper motor 9, and "0" is put into the stepper motor rotating direction DIR. As mentioned previously, DIR=0 indicates the rotating direction wherein the valve head 36 (FIG. 2) is moved to open, and DIR=1 indicates the rotating direction wherein the valve head 36 is moved to close. Then, in step 160, it is determined whether the warm-up step position ST is larger than the starting step position SSTA illustrated in FIG. 17. If it is determined in step 160 that the warm-up step position ST is larger than the starting step position SSTA, "SSTA+1" is input into SSTA in step 161. Consequently, at this time, SSTA no longer indicates the starting step position illustrated in FIG. 17, but indicates the step position determined by the warm-up control. Then, in step 162, the step number "1" of the step motor 9 snd the step motor rotating direction DIR=0 are stored in a predetermined address in the RAM 81. On the other hand, if it is determined in step 160 that the warm-up step position ST is not larger than the step position SSTA, it is determined in step 163 whether the warm-up step position ST is equal to the step position SSTA. If it is determined in step 163 that the warm-up step position ST is not equal to the step position SSTA, "SSTA-1" is put into the step position SSTA in step 164, and "1" is also put into the stepper motor rotating direction DIR. Then, in stepper 103 in FIG. 14, the step motor 9 is rotated by the step number stored in the RAM 81 in the rotating direction stored in the RAM 81. On the other hand, if it is determined in step 163 that the warm-up step position ST is equal to the step position SSTA, the step motor drive processing is executed in step 103. However, at this time, the stepper motor 9 actually remains stationary. Consequently, when the step position SSTA becomes equal to the warm-up stepper position ST, the step motor 9 remains stopped. As mentioned above, the time 4 in FIG. 16 indicates the moment when the stepper position of the step motor 9 reaches the starting step position SSTA and, at this time, the warm-up control is started. If the warm-up control is started, the stepper motor 9 is rotated by one step every 3 sec and, when the stepper position of the step motor 9 reaches the warm-up stepper position ST, the step motor 9 is stopped. This time is indicated by $t_5$ in FIG. 16. After the time $t_5$, when the temperature T of the cooling water of the engine is increased and, thus, the warm-up step position ST is changed, the step motor 9 is rotated by one step. In the case wherein ST1 has been put into the warm-up step position ST after the time $t_5$, when, for example, the hot max. switch 74 is turned to the ON position, ST2 is put into the warm-up step position ST. As a result of this, the stepper motor 9 is rotated by one step every 3 sec from ST1 to ST2.

Figure 20:
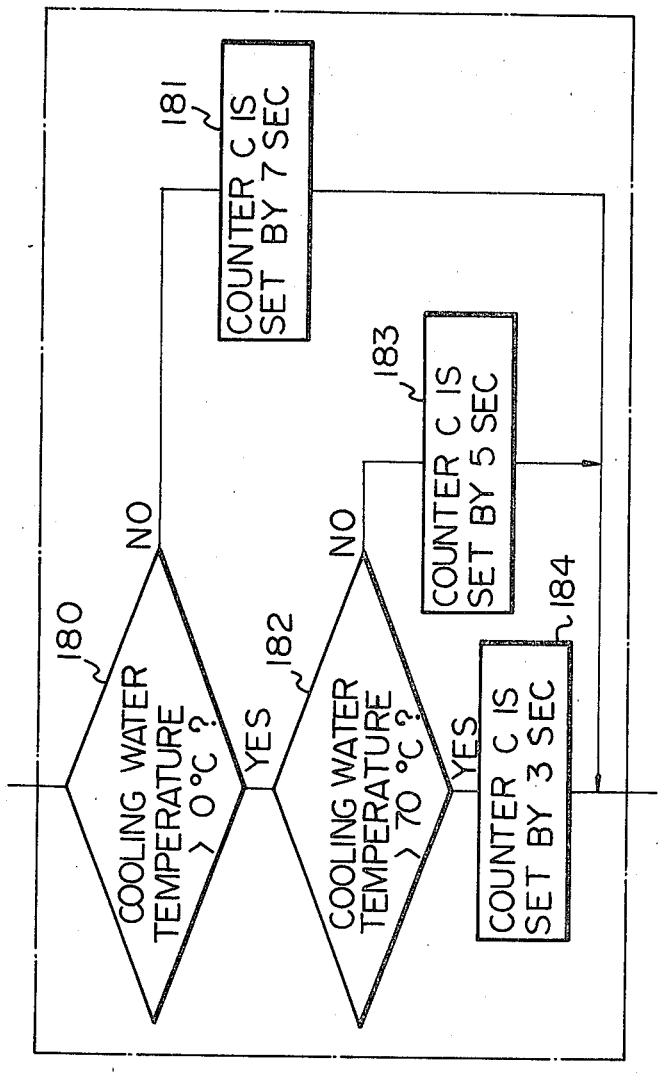
FIG. 20 is a flow chart illustrating the flow of the operation of an alternative embodiment according to the present invention.

As mentioned previously with reference to FIG. 11, the hot max. switch 74 is turned to the ON position when all the air flowing within the air duct 203 is caused to pass through the heat exchanger 224. That is, when it is necessary to increase the temperature of air flowing out from the air outlet 202 of the air duct 203, the hot max. switch 74 is turned to the ON position. In addition, the cool max. switch 75 is turned to the ON position when the flow of air passing through the heat exchanger 224 is completely shut off. That is, when it is necessary to reduce the temperature of air flowing out from the air outlet 202 of the air duct 203, the cool max. switch 75 is turned to the ON position. Consequently, when the hot max. switch 74 is turned to the ON position, the warm-up step position ST is increased to ST2 illustrated in FIG. 19 and, thereby, the idling speed of the engine is increased. As a result of this, the temperature of the cooling water of the engine is increased and, thus, the temperature of air heated by the heat exchanger 224 is increased. On the other hand, when the cool max. switch 75 is turned to the ON position, the warm-up position ST is also increased to ST3 illustrated in FIG. 19 and, thereby, the idling speed of the engine is increased. As a result of this, the rotating speed of the compressor (not shown) is increased and, thus, the temperature of air cooled by the evaporator 223 is reduced. In addition, since the frictional force in various portions of the engine is reduced as the temperature of the cooling water of the engine is increased at the time of warm-up of the engine, if the stepper motor 9 remains stationary, the engine speed is gradually increased. Consequently, in the present invention, as the temperature of the cooling water of the engine is increased, the stepper motor 9 is rotated by one step every 3 seconds as illustrated between the time $t_4$ and the time $t_5$ in FIG. 16 so that the engine speed is maintained approximately constant. In addition, when, for example, the hot max. switch 74 is turned to the ON position at the time of idling, if the warm-up step position ST is instantaneously change from ST1 to ST2 in FIG. 19, the engine speed is instantaneously increased. However, such an instantaneous increase in the engine speed causes anxiety to the driver. Therefore, in the present invention, when, for example, the hot max. switch 74 is turned to the ON position, the stepper motor 9 is rotated by one step every 3 seconds from ST1 to ST2 in FIG. 19 for preventing the engine speed from being instantaneously increased. In addition, as mentioned above, during the time period from the time $t_4$ to the time $t_5$ in FIG. 16, the stepper motor 9 is rotated by one step every 3 seconds as the temperature of the cooling water of the engine is increased. However, as the temperature of the cooling water of the engine is reduced, the length of time which is necessary until the engine speed becomes stable after the amount of air flowing within the bypass pipe 16 (FIG. 1) is changed, becomes long. Consequently if the stepper motor 9 is rotated too fast when the temperature of the cooling water of the engine is low, the amount of harmful components in the exhaust gas is increased and, in addition, fuel consumption is increased. Therefore, it is preferable that the rotating speed of the stepper motor 9 be reduced as the temperature of the cooling water of the engine becomes low. In order to reduce the rotating speed of the engine as the temperature of the cooling water of the engine becomes low as mentioned above, it is necessary to replace the portion A of the flow chart illustrated in FIG. 14 and the portion B of the flow chart illustrated in FIG. 15 by the flow chart illustrated in FIG. 20. That is, in the flow chart illustrated in FIG. 20, firstly, in step 180, it is determined whether the temperature of the cooling water of the engine is higher than 0° C. If it is determined in step 180 that the temperature of the cooling water of the engine is not higher than 0° C., the counter C is set by 7 sec in step 181. On the other hand, if it is determined in step 180 that the temperature of the cooling water of the engine is higher than 0° C., it is determined in step 182 whether the temperature of the cooling water of the engine is higher than 70° C. If it is determined in step 182 that the temperature of the cooling water of the engine is not higher than 70° C., the counter C is set by 5 sec in step 183. Contrary to this, if it is determined in step 182 that the temperature of the cooling water of the engine is higher than 70° C., the counter C is set by 3 sec in step 184. Consequently, the length of time by which the counter C is set becomes long as the temperature of the cooling water of the engine becomes low. Therefore, the time interval, at which the stepper motor 9 is rotated by one step during the time period from the time $t_4$ to the time $t_5$ in FIG. 16, becomes long as the temperature of the cooling water of the engine is reduced.

According to the present invention, it is possible to precisely control the amount of air flowing within the bypass pipe by using a stepper motor. In addition, by rotating the stepper motor 9 by one step every 3 sec during the time period from the time $t_4$ to the time $t_5$ in FIG. 16, it is possible to maintain the engine speed approximately constant and prevent the engine speed from being instantaneously increased when, for example, the hot max. switch is turned to the ON position.

While the invention has been described by reference to specific embodiments chosen for purposes of illustration, it should be apparent that numerous modifications could be made thereto by those skilled in the art without departing from the basic concept and scope of the invention.

We claim:

1. A method of controlling the idling speed of an engine comprising a main intake passage, a throttle valve arranged in the main intake passage, a bypass passage branched off from the main intake passage upstream of the throttle valve and connected to the main intake passage downstream of the throttle valve, a control valve arranged in the bypass passge, and a stepper motor actuating the control valve for controlling the amount of air flowing within the bypass passage, wherein said method comprises:
    determining a first stepper motor position related to the temperature of a coolant of the engine;
    determining the speed of the engine;
    rotating the stepper motor at a first speed from an initial position wherein the control valve is opened to said first position for reducing a flow area of the bypass passage when the engine is started and the speed of the engine exceeds a predetermined speed; and
    increasing said predetermined speed as the temperature of the coolant of the engine is reduced.

2. A method of controlling the idling speed of an engine comprising a main intake passage, a throttle valve arranged in the main intake passage, a bypass passage branched off from the main intake passage upstream of the throttle valve and connected to the main intake passage downstream of the throttle valve, a control valve arranged in the bypass passage, and a stepper motor actuating the control valve for controlling the amount of air flowing within the bypass passage, wherein said method comprises:
    determining a first stepper motor position related to the temperature of a coolant of the engine;
    rotating the stepper motor at a first speed from an initial step position wherein the control valve is opened to said first position for reducing a flow area of the bypass passage when the engine is started;
    determining a second stepper motor position which is different from said first position and is related to the temperature of the coolant of the engine;
    rotating the stepper motor from said first position to said second position at a second speed which is lower than said first speed after the stepper motor reaches said first position; and
    increasing said second rotating speed as the temperature of the coolant of the engine is increased after the engine has warmed-up.

3. An apparatus for controlling the idling speed of an engine, comprising:
    a main intake passage;
    a throttle arranged in the main intake passage;
    a bypass passage branched off from the main intake passage upstream of the throttle valve and connected to the main intake passage downstream of the throttle valve;
    a control valve arranged in the bypass passge;
    a stepper motor actuating the control valve for controlling the amount of air flowing within the bypass passage;
    means for determining the temperature of a coolant of the engine; means for determining the speed of the engine; and processing means for,
    determining a first stepper motor position related to the temperature of the coolant,
    producing signals for rotating the stepper motor at a first speed from an initial position wherein the control valve is opened to the first position for reducing a flow area of the bypass passage when the engine is started and when the speed of the engine exceeds a predetermined speed, and
    increasing the predetermined speed as the temperature of the coolant of the engine is reduced.

4. An apparatus for controlling the idling speed of an engine, comprising:
    a main intake passage;
    a throttle valve arranged in the main intake passage;
    a bypass passage branched off from the main intake passage upstream of the throttle valve and connected to the main intake passage downstream of the throttle valve;
    a control valve arranged in the bypass passage;
    a stepper motor actuating the control valve for controlling the amount of air flowing within the bypass passage;
    means for determining the temperature of a coolant of the engine; and
    processing means for,
    determining a first stepper motor position related to the temperature of the coolant, producing signals for rotating the stepper motor at a first speed from an initial position wherein the control valve is opened to the first position for reducing a flow area of the bypass passage when the engine is started, determining a second stepper motor position which is different from said first position and is related to the temperature of the coolant of the engine, producing signals for rotating the stepper motor from said first position to said second position at a second speed which is lower than the first speed after the stepper motor reaches the first position, and increasing said second rotating speed as the temperature of the coolant of the engine is increased after the engine has warmed-up.

5. A method according to claim 1, further including the step of measuring the voltage of a power source, and wherein the rotation of said stepper motor is started when the voltage of the power source of the engine is higher than a predetermined voltage.

6. A method according to claim 1, including the step of maintaining said first rotating speed constant.

7. A method according to claim 1, wherein the step of determining said first stepper motor position includes reducing the degree of opening of the control valve, which corresponds to said first position, as the temperature of the coolant of the engine is increased after the engine has warmed-up.

8. A method according to claim 1, further comprising the step of rotating said stepper motor at a second speed slower than said first speed from said first position to a second position which is different from said first position after the stepper motor reaches said first position, said second position being determined by the temperature of the coolant of the engine.

9. A method according to claim 8 or 2, including the step of maintaining said second rotating speed constant.

10. A method according to claim 2, wherein said step of determining said second position includes reducing the degree of opening of the control valve, which corresponds to said second position, as the temperature of the coolant of the engine is increased after the engine has warmed-up.

11. A method according to claim 2, further including the step of repeatedly redetermining said second position so that the degree of opening of the control valve is reduced as the temperature of the coolant of the engine is increased after the position of the stepper motor reaches the second position and rotating the stepper motor to the newly determined second position.

12. A method according to claim 11, including the step of determining when a heating device for heating a drivers compartment is operating at a maximum, and rotating the stepper motor from said second position to a first idle-up position when said heating device is operating at a maximum, the degree of opening of the control valve which corresponds to said first idle-up position being greater than the degree of opening of the control valve which corresponds to said second position.

13. A method according to claim 12, including the step of determining when a cooling device for cooling the driver's compartment is operatng at a maximum, and rotating the stepper motor from said second position to a second idle-up position when said cooling device is operating at a maximum, the degree of opening of the control valve which corresponds to said second idle-up position being greater than the degree of opening of the control valve which corresponds to said second position.

14. An apparatus according to claim 3, including a power source and means for measuring the voltage of the power source, and wherein the rotation of said stepper motor is started when the voltage of the power source of the engine is greater than a predetermined voltage.

15. An apparatus according to claim 3, wherein said processing means maintains said first speed constant.

16. An apparatus according to claim 3, wherein the processing means reduces the degree of opening of the control valve in said first position as the temperature of the coolant of the engine is increased after the engine has warmed-up.

17. An apparatus according to claim 4, wherein said processing means maintains said second speed constant.

18. An apparatus according to claim 4, wherein the processing means determines said second position by reducing the degree of opening of the control valve as the temperature of the coolant of the engine is increased after the engine has warmed-up.

19. An apparatus according to claim 4, wherein the processing means repeatedly redetermines said second position so that the degree of opening of the control valve is reduced as the temperature of the coolant of the engine is increased after the position of the stepper motor reaches the second position and produces signals to rotate the stepper motor to the newly determined second position.

20. An apparatus according to claim 19, including means for heating a driver's compartment, and wherein the stepper motor is rotated from the second position to a first idle-up position when the heating means is operated at a maximum, the degree of opening of the control valve which corresponds to said first idle-up position being greater than the degree of opening of the control valve which corresponds to said second position.

21. An apparatus according to claim 20, including means for cooling the driver's compartment, and wherein the stepper motor is rotated from the second position to a second idle-up position when the cooling means is operated at a maximum, the degree of opening of the control valve which corresponds to said second idle-up position being greater than the degree of opening of the control valve which corresponds to said second position.

* * * * *